US010389900B2

(12) United States Patent
Arimori et al.

(10) Patent No.: US 10,389,900 B2
(45) Date of Patent: Aug. 20, 2019

(54) IMAGE READING APPARATUS

(71) Applicant: SEIKO EPSON CORPORATION, Tokyo (JP)

(72) Inventors: Kazuhiko Arimori, Fukuoka (JP); Hidetoshi Masuda, Fukuoka (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/859,904

(22) Filed: Jan. 2, 2018

(65) Prior Publication Data
US 2018/0220021 A1 Aug. 2, 2018

(30) Foreign Application Priority Data

Jan. 31, 2017 (JP) ................................ 2017-015768

(51) Int. Cl.
*H04N 1/00* (2006.01)
*H04N 1/203* (2006.01)
*H04N 1/04* (2006.01)

(52) U.S. Cl.
CPC ....... *H04N 1/00737* (2013.01); *H04N 1/0071* (2013.01); *H04N 1/00602* (2013.01); *H04N 1/00713* (2013.01); *H04N 1/00745* (2013.01); *H04N 1/00774* (2013.01); *H04N 1/00777* (2013.01); *H04N 1/0464* (2013.01); *H04N 1/203* (2013.01); *H04N 1/0074* (2013.01); *H04N 1/00718* (2013.01); *H04N 1/00769* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 5,664,895 A | * | 9/1997 | Asai | B41J 2/22 400/248 |
| 5,805,308 A | * | 9/1998 | Tanaka | H04N 1/00681 271/171 |
| 9,823,129 B2 | * | 11/2017 | Kuri | G01J 3/0229 |
| 10,207,882 B2 | * | 2/2019 | Kitsuki | B65H 3/66 |
| 10,225,421 B2 | * | 3/2019 | Harada | B65H 29/70 |
| 2005/0056180 A1 | | 3/2005 | Noda et al. | |
| 2006/0077242 A1 | * | 4/2006 | Takeishi | B41J 11/0065 347/101 |

(Continued)

FOREIGN PATENT DOCUMENTS

| JP | 2005-096429 A | 4/2005 |
|---|---|---|
| JP | 2010-132417 A | 6/2010 |
| JP | 2012-193040 A | 10/2012 |

OTHER PUBLICATIONS

The Extended European Search Report for the corresponding European Patent Application No. 18154044.4 dated Jun. 1, 2018.

*Primary Examiner* — Ahn-Vinh T Nguyen

(57) ABSTRACT

An image reading apparatus is provided with a reader which reads a document, a transport roller which is provided on an upstream side of the reader in a document transport path in which the document is transported and transports the document to a reading position of the reader, and a controller which receives reading data of the reader and controls the transport roller, in which the controller receives the reading data from the reader to acquire a form of the document, and selects whether or not to stop driving of the transport roller based on the form.

13 Claims, 18 Drawing Sheets

(56) References Cited

U.S. PATENT DOCUMENTS

| | | | |
|---|---|---|---|
| 2006/0171002 A1* | 8/2006 | Mori | H04N 1/3873 358/538 |
| 2007/0109338 A1* | 5/2007 | Niioka | B41J 11/0095 347/16 |
| 2008/0279571 A1 | 11/2008 | Noda et al. | |
| 2009/0073512 A1* | 3/2009 | Kobayashi | B65H 7/20 358/498 |
| 2010/0002205 A1* | 1/2010 | Suzuki | B41J 3/407 355/22 |
| 2010/0091315 A1* | 4/2010 | Shiraki | G03G 15/5016 358/1.13 |
| 2011/0013240 A1* | 1/2011 | Kobayashi | B65H 7/02 358/498 |
| 2012/0062626 A1* | 3/2012 | Ishikawa | B41J 2/2135 347/5 |
| 2012/0235929 A1 | 9/2012 | Hongo et al. | |
| 2013/0306784 A1* | 11/2013 | Ueyama | B41J 11/001 242/560 |
| 2013/0321886 A1* | 12/2013 | Adachi | H04N 1/00602 358/498 |
| 2014/0054845 A1 | 2/2014 | Morikawa et al. | |
| 2014/0118763 A1* | 5/2014 | Minakuchi | H04N 1/00763 358/1.12 |
| 2014/0132690 A1* | 5/2014 | Shimada | B41J 11/0085 347/104 |
| 2014/0140744 A1* | 5/2014 | Akai | G03G 15/607 399/371 |
| 2015/0035887 A1* | 2/2015 | Yoshihisa | B41J 3/60 347/14 |
| 2015/0036220 A1* | 2/2015 | Yamashita | B26F 1/02 359/619 |
| 2015/0264194 A1* | 9/2015 | Kubo | H04N 1/00572 358/1.12 |
| 2015/0350475 A1* | 12/2015 | Uchiyama | H04N 1/00734 358/474 |
| 2017/0374214 A1* | 12/2017 | Kanamitsu | B65H 3/063 |

* cited by examiner

FIG. 7
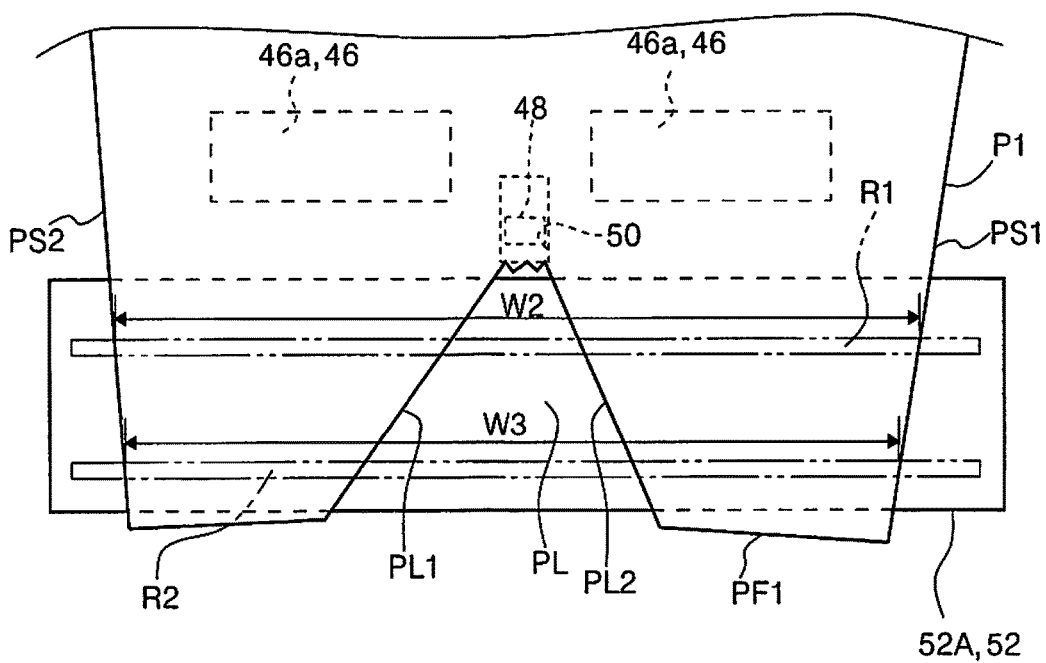
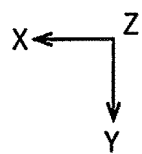

FIG. 9
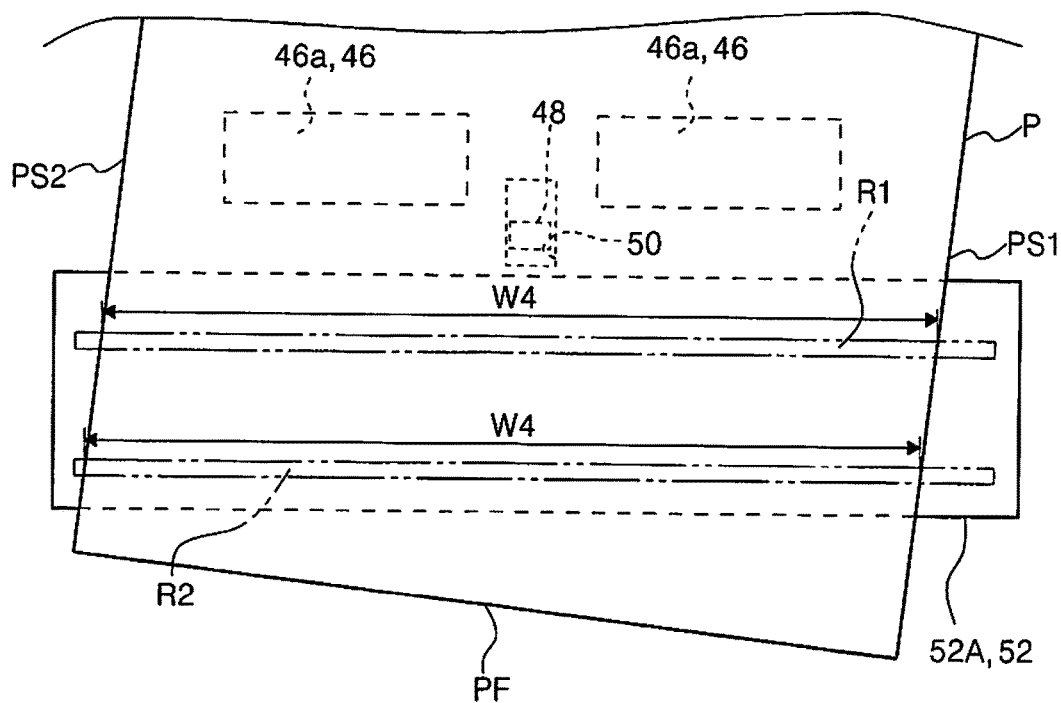
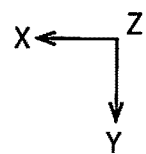

FIG. 11
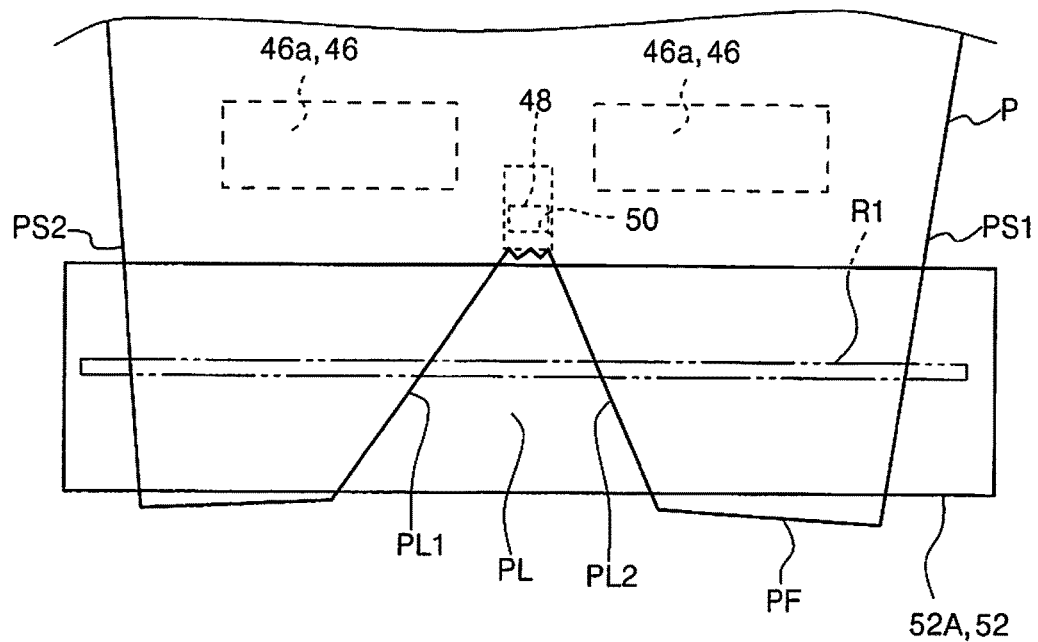
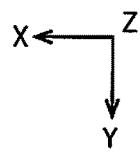

FIG. 12
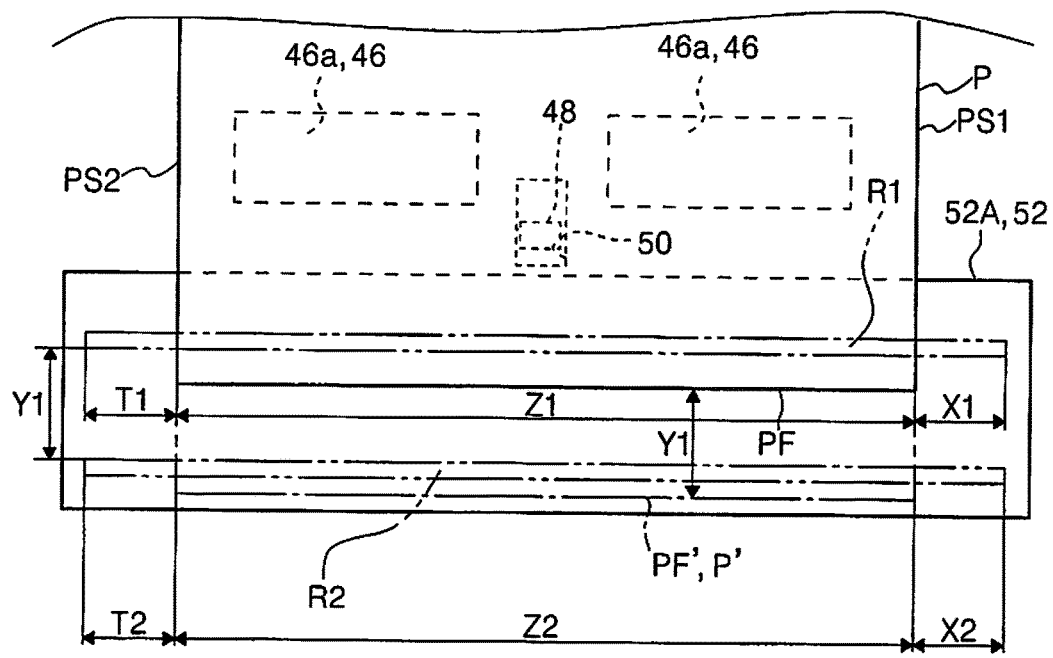
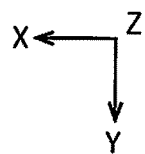

FIG. 13
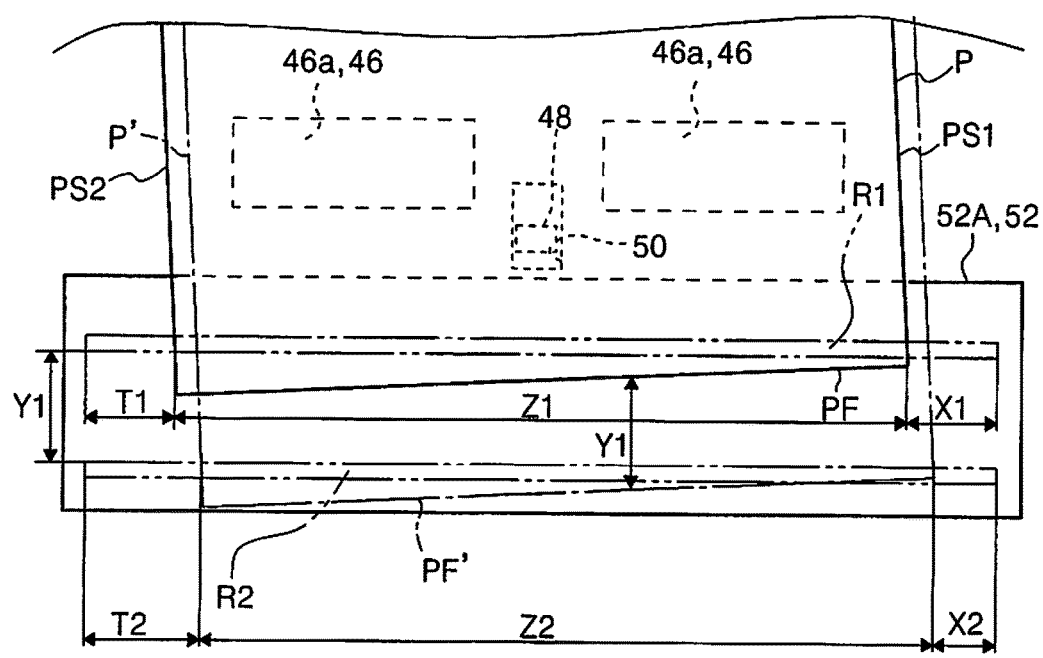
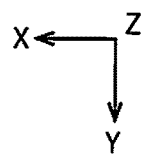

FIG. 14
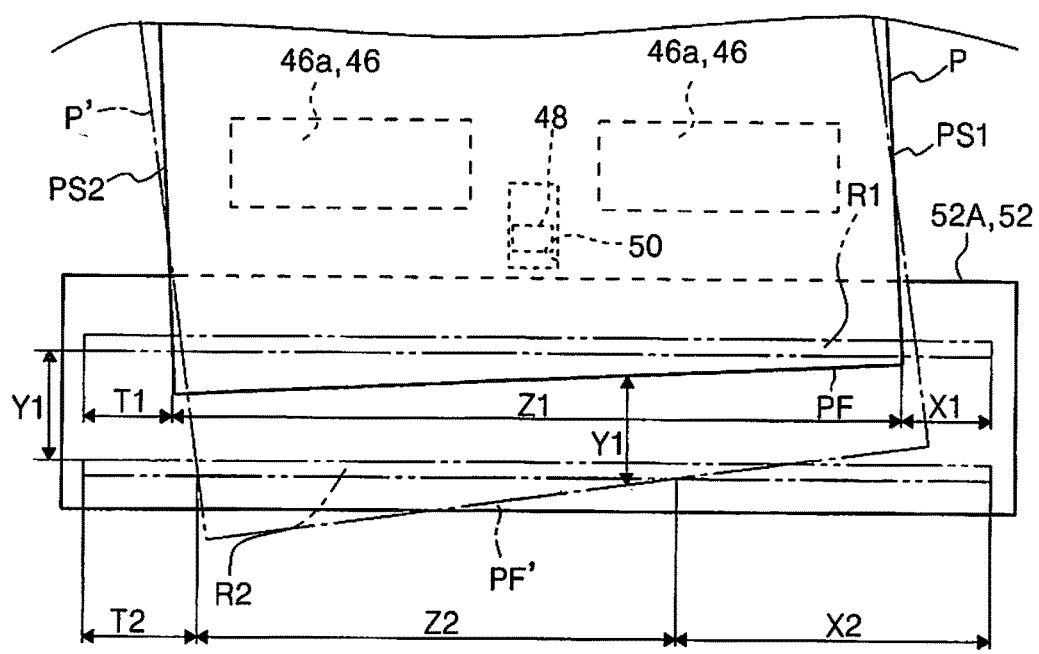
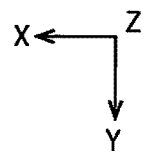

FIG. 16
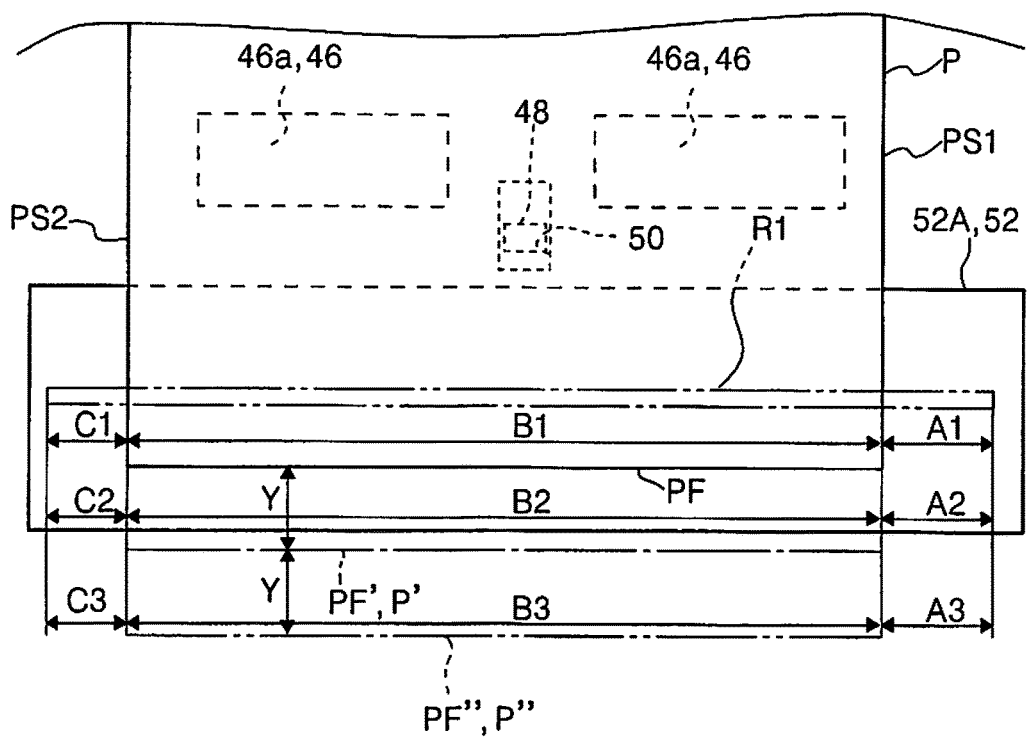
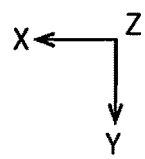

FIG. 17
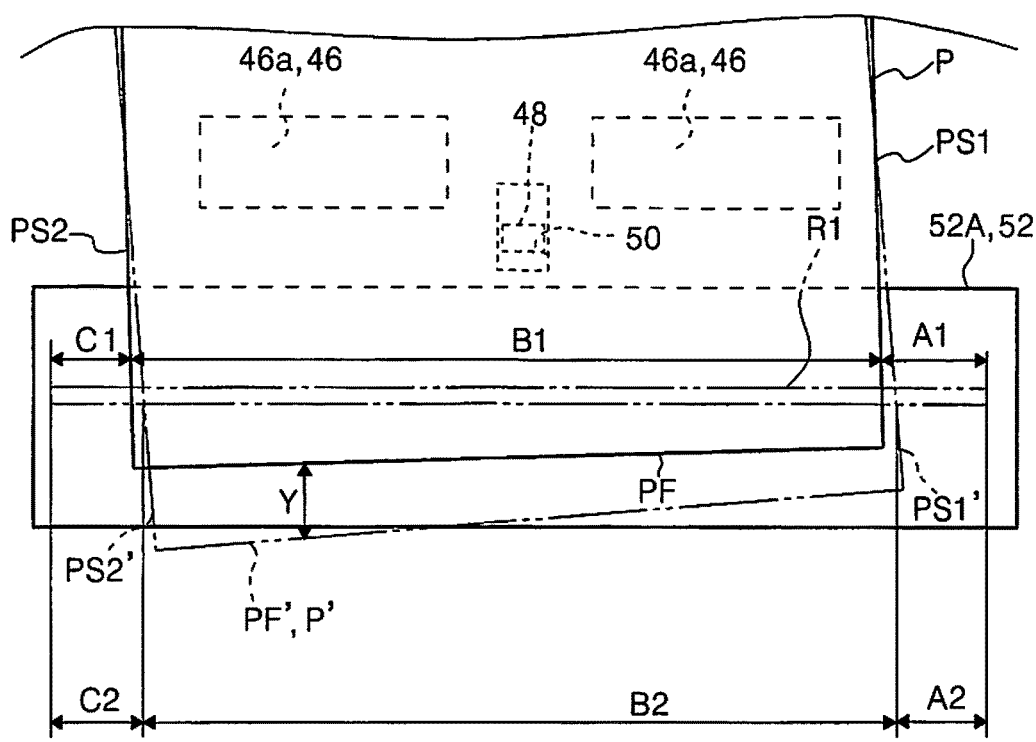
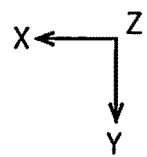

FIG. 18
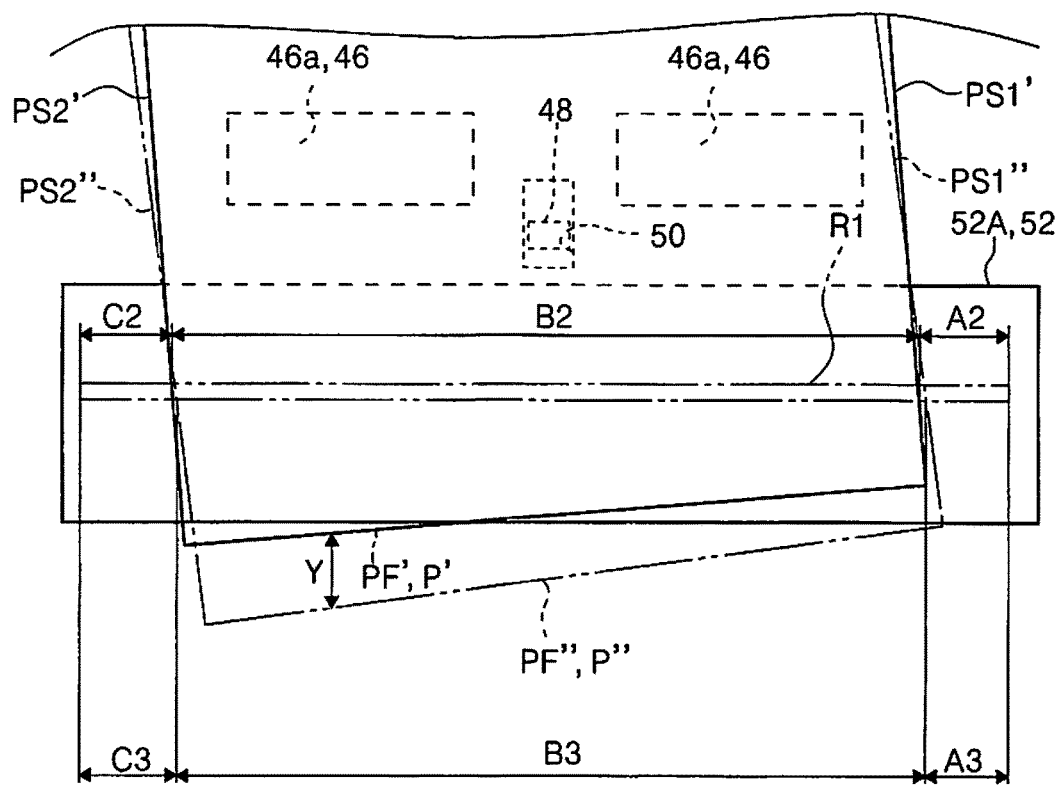
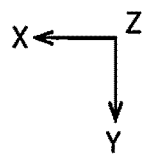

IMAGE READING APPARATUS

BACKGROUND

1. Technical Field

The present invention relates to an image reading apparatus which reads an image of a document.

2. Related Art

Hereinafter, a description will be given of an example of a scanner which is an example of an image reading apparatus. The scanner is provided with a feeding apparatus which automatically feeds documents (also referred to as an Auto Document Feeder (ADF)) and is configured to be capable of performing automatic feeding and reading of multiple documents.

Here, there is a case in which jamming occurs in a document transport path inside the image reading apparatus and various jam detection units are adopted in the related art. However, since a drive load is already applied to the document at the timing at which it is determined that there is jamming, the document or the apparatus may be damaged.

JP-A-2012-193040 discloses a method of detecting a sound which is generated in the document transport path using a microphone and detecting jamming of the document based on a reference value relating to the strength of the sound and a reference value relating to the continuation time of the sound.

In the jamming detection unit disclosed in JP-A-2012-193040, it is necessary to install a dedicated microphone for detecting the jamming which leads to an increase in the cost of the apparatus.

Generally, a document detection unit which detects the passage of the document is provided inside the image reading apparatus, and there is a method of determining that there is jamming in a case in which the document detection unit does not detect the rear end of the document within a predetermined time after detecting the document leading end; however, with this method, since the transporting of the document is continued for the predetermined time even if jamming occurs, the document or the apparatus may be damaged.

SUMMARY

An advantage of some aspects of the invention is to provide an image reading apparatus which is capable of suppressing damage formation to a document accompanying jamming to a minimum amount while suppressing an increase in the cost of the apparatus.

According to an aspect of the invention, an image reading apparatus is provided with a reader which reads a document, a transport roller which is provided on an upstream side of the reader in a document transport path in which the document is transported and transports the document to a reading position of the reader, a detection unit which is provided between the transport roller and the reader in the document transport path and generates a detection signal based on passage of at least a document leading end, and a controller which receives the detection signal and reading data of the reader and controls the transport roller, in which the controller receives the reading data from the reader after receiving the detection signal to acquire a form of the document, and selects whether or not to stop driving of the transport roller based on the form.

In a case in which jamming occurs, the form of the document which is acquired by the reader is different from the form of the document when the document is ordinarily transported. Therefore, using this property, since the controller of the image reading apparatus of this configuration receives the reading data from the reader after receiving the detection signal, acquires the form of the document, and determines whether or not to stop the driving of the transport roller based on the form, it is possible to detect the jamming without providing a dedicated unit for detecting jamming and it is possible to suppress an increase in the cost of the apparatus. Additionally, since it is not necessary to stop the transport roller after the transport roller is driven for a predetermined time, which is set based on the document length, after the passing of the document leading end is detected by the detection unit, it is possible to suppress damage formation to the document that accompanies jamming to a minimum level.

In the present specification, the term "the form of the document" means the form of the document as can be ascertained from an outline of the document alone. The term "the form of the document" does not mean the form of the entirety of the document and means the form of at least a portion of the document which is read by the reader.

The controller may select whether or not to stop the driving of the transport roller based on, of the form, the state of both edges of the document.

In this configuration, since the controller may determine whether or not there is jamming based on, of the form of the document, the state of both edges of the document and may select whether or not to stop the driving of the transport roller, it is possible to more accurately determine whether or not there is jamming.

The controller may stop the driving of the transport roller in a case in which the edge of one side of the document is not parallel to the edge of the other side.

In this configuration, since the controller stops the driving of the transport roller in a case in which the edge of one side of the document is not parallel to the edge of the other side, it is possible to easily perform determination of whether or not there is jamming.

The controller may stop the driving of the transport roller in a case in which the form includes a missing portion of the document in a direction which intersects the document transport direction.

In a case in which jamming occurs, the form of the document which is acquired by the reader may include a missing portion. Therefore, using this property, since the controller of the image reading apparatus in this configuration determines that there is jamming and stops the driving of the transport roller in a case in which the form includes a missing portion of the document in a direction which intersects the document transport direction, it is possible to easily perform the determination of whether or not there is jamming.

According to another aspect of the invention, an image reading apparatus includes a first reader which is disposed on a first surface side of a document in a document transport path in which the document is transported and reads the first surface of the document, a second reader which is disposed on a second surface side of an opposite side from the first surface side and reads the second surface of the document which is positioned on a downstream side of the first reader in the document transport path, a transport roller which is provided on an upstream side of the first reader in the document transport path and transports the document to a reading position of the first reader and a reading position of the second reader, a detection unit which is provided between the transport roller and the first reader in the document transport path and generates a detection signal based on passage of at least a document leading end and a controller which receives the detection signal and reading data of the first reader and the second reader and controls the transport roller, in which the controller receives the reading data from the first reader and the second reader after receiving the detection signal to acquire a document width, and compares a first document width which is acquired based on the reading data of the first reader and a second document width which is acquired based on the reading data of the second reader to select whether or not to stop driving of the transport roller.

In a case in which jamming occurs, the document widths which are acquired by each of the first reader and the second reader which are disposed at deviated positions in the document transport path may be different. Therefore, using this property, since the controller of the image reading apparatus in this configuration compares the first document width which is acquired based on the reading data of the first reader to the second document width which is acquired based on the reading data of the second reader to determine whether or not there is jamming and selects whether or not to stop the driving of the transport roller, it is possible to detect the jamming without providing a dedicated unit for detecting jamming and it is possible to suppress an increase in the cost of the apparatus.

Additionally, since it is not necessary to stop the transport roller after the transport roller is driven for a predetermined time, which is set based on the document length, after the passing of the document leading end is detected by the detection unit, it is possible to suppress damage formation to the document that accompanies jamming to a minimum level.

The controller may stop the driving of the transport roller in a case in which the difference between the first document width and the second document width is greater than or equal to a predetermined value.

In this configuration, since the controller determines that there is jamming and stops the driving of the transport roller in a case in which the difference between the first document width and the second document width is greater than or equal to the predetermined value, it is possible to easily perform determination of whether or not there is jamming.

According to still another aspect of the invention, an image reading apparatus includes a reader which reads a document, a transport roller which is provided on an upstream side of the reader in a document transport path in which the document is transported and transports the document to a reading position of the reader, and the controller which receives reading data of the reader and controls the transport roller, in which the controller acquires a distance A between an end portion of one side of the document and an end portion of one side of the reader which is obtained based on the reading data in a document width direction which is a direction which intersects a document transport direction in states before and after the document is first transported by a transport amount Y and after the document is further transported by the transport amount Y, and when the distance A before the document is first transported by the transport amount Y is set to A1, the distance A after the document is first transported by the transport amount Y is set to A2, and the distance A after the document is further transported by the transport amount Y is set to A3, in a case in which the difference between A1−A2 and A2−A3 exceeds a predetermined threshold, the controller stops the driving of the transport roller.

For example, when the reading of multiple documents is to be performed, when the documents are bound at one of the four corners by a staple and the documents are accidentally set in the image reading apparatus in this state (without removing the staple) and the feeding is to be performed, the document to be fed rotates in a manner which draws an arc centered on the binding position of the staple, that is, the degree of skewing becomes more notable the more the feeding progresses, resulting in jamming.

It is possible to detect such a series of movements of the document through the changing of the edge positions with the transporting of the document.

In this configuration, since the controller acquires the distance A (that is, the edge position of one side of the document) between an end portion of one side of the document and an end portion of one side of the reader which is obtained based on the reading data in states before and after the document is first transported by the transport amount Y and after the document is further transported by the transport amount Y, and determines whether or not to stop the driving of the transport roller based on the change therein, it is possible to detect the jamming without providing a dedicated unit for detecting jamming and it is possible to suppress an increase in the cost of the apparatus.

Additionally, using the detection unit which detects the passage of the document, since it is not necessary to stop the transport roller after the transport roller is driven for a predetermined time, which is set based on the document length, after the passing of the document leading end is detected by the detection unit, it is possible to suppress damage formation to the document that accompanies jamming to a minimum level.

According to still another aspect of the invention, an image reading apparatus includes a reader which reads a document, a transport roller which is provided on an upstream side of the reader in a document transport path in which the document is transported and transports the document to a reading position of the reader, and the controller which receives reading data of the reader and controls the transport roller, in which the controller acquires a distance B between an end portion of one side of the document and an end portion of the other side which is obtained based on the reading data in a document width direction which is a direction which intersects a document transport direction in states before and after the document is first transported by a transport amount Y and after the document is further transported by the transport amount Y, and when the distance B before the document is first transported by the transport amount Y is set to B1, the distance B after the document is first transported by the transport amount Y is set to B2, and the distance B after the document is further transported by the transport amount Y is set to B3, in a case in which the difference between B1−B2 and B2−B3 exceeds a predetermined threshold, the controller stops the driving of the transport roller.

In this configuration, since the controller acquires the distance B (that is, document width) between an end portion of one side of the document and an end portion of the other side which is obtained based on the reading data in states before and after the document is first transported by the transport amount Y and after the document is further transported by the transport amount Y, and determines whether or not to stop the driving of the transport roller based on the change therein, it is possible to obtain the same operations and effects as in an above-described configuration.

According to still another aspect of the invention, an image reading apparatus includes a first reader which is disposed on a first surface side of a document in a document transport path in which the document is transported and reads the first surface of the document, a second reader which is disposed on a second surface side of an opposite side from the first surface side and reads the second surface of the document which is positioned on a downstream side of the first reader in the document transport path, a transport roller which is provided on an upstream side of the first reader in the document transport path and transports the document to a reading position of the first reader and a reading position of the second reader, and a controller which receives reading data of the first reader and the second reader and controls the transport roller, in which the controller acquires a distance X1 between an end portion of one side of the document and an end portion of one side of the first reader which is obtained based on the reading data of the first reader in a document width direction which is a direction which intersects a document transport direction, in which the controller acquires a distance X2 between the end portion of one side of the document and an end portion of one side of the second reader which is obtained based on the reading data of the second reader in the document width direction when the document is transported by a transport amount corresponding to a disposition interval between the first reader and the second reader, and in which in a case in which a difference between the distance X1 and the distance X2 exceeds a predetermined threshold, the controller stops driving of the transport roller.

When the documents are bound at one of the four corners by a staple and the documents are accidentally set in the image reading apparatus in this state (without removing the staple) and the feeding is to be performed, the document to be fed rotates in a manner which draws an arc centered on the binding position of the staple, that is, the degree of skewing becomes more notable the more the feeding progresses, resulting in jamming.

Such a series of movements of the document can be detected according to differences in the edge positions which are detected by the two readers (the first reader and the second reader) which are disposed leaving a predetermined interval therebetween in the document transport direction.

In this configuration, since it is determined whether or not to stop the driving of the transport roller based on the differences in the edge positions which are detected by the two readers (the first reader and the second reader), it is possible to detect the jamming without providing a dedicated unit for detecting jamming and it is possible to suppress an increase in the cost of the apparatus.

Additionally, using the detection unit which detects the passage of the document, since it is not necessary to stop the transport roller after the transport roller is driven for a predetermined time, which is set based on the document length, after the passing of the document leading end is detected by the detection unit, it is possible to suppress damage formation to the document that accompanies jamming to a minimum level.

According to still another aspect of the invention, an image reading apparatus includes a first reader which is disposed on a first surface side of a document in a document transport path in which the document is transported and reads the first surface of the document, a second reader which is disposed on a second surface side of an opposite side from the first surface side and reads the second surface of the document which is positioned on a downstream side of the first reader in the document transport path, a transport roller which is provided on an upstream side of the first reader in the document transport path and transports the document to a reading position of the first reader and a reading position of the second reader, and a controller which receives reading data of the first reader and the second reader and controls the transport roller, in which the controller acquires a distance Z1 between an end portion of one side of the document and an end portion of the other side which is obtained based on the reading data of the first reader in a document width direction which is a direction which intersects a document transport direction, in which the controller acquires a distance Z2 between the end portion of one side of the document and the end portion of the other side of the document which is obtained based on the reading data of the second reader in the document width direction when the document is transported by a transport amount corresponding to a disposition interval between the first reader and the second reader, and in which in a case in which a difference between the distance Z1 and the distance Z2 exceeds a predetermined threshold, the controller stops driving of the transport roller.

In this configuration, since it is determined whether or not to stop the driving of the transport roller based on the differences in the document widths which are detected by the two readers (the first reader and the second reader), it is possible to obtain the same operations and effects as in an above-described configuration.

BRIEF DESCRIPTION OF THE DRAWINGS

The invention will be described with reference to the accompanying drawings, wherein like numbers reference like elements.

FIG. 7 is a diagram illustrating a state in which paper jamming is detected in the image reading unit according to the first example.

FIG. 9 is a diagram illustrating a state in which skewing is detected in the image reading unit according to the first example.

FIG. 11 is a diagram illustrating a state in which paper jamming is detected in an image reading unit according to the second example.

FIG. 12 is a diagram illustrating an ordinary feeding state in an image reading unit according to a third example.

FIG. 13 is a diagram illustrating a state in which oblique motion occurs in the image reading unit according to the third example.

FIG. 14 is a diagram illustrating a state in which skewing occurs in the image reading unit according to the third example.

FIG. 16 is a diagram illustrating an ordinary feeding state in an image reading unit according to a fourth example.

FIG. 17 is a diagram illustrating a state in which skewing occurs in the image reading unit according to the fourth example.

FIG. 18 is a diagram illustrating a state in which skewing occurs in the image reading unit according to the fourth example.

DESCRIPTION OF EXEMPLARY EMBODIMENTS

Figure 1:
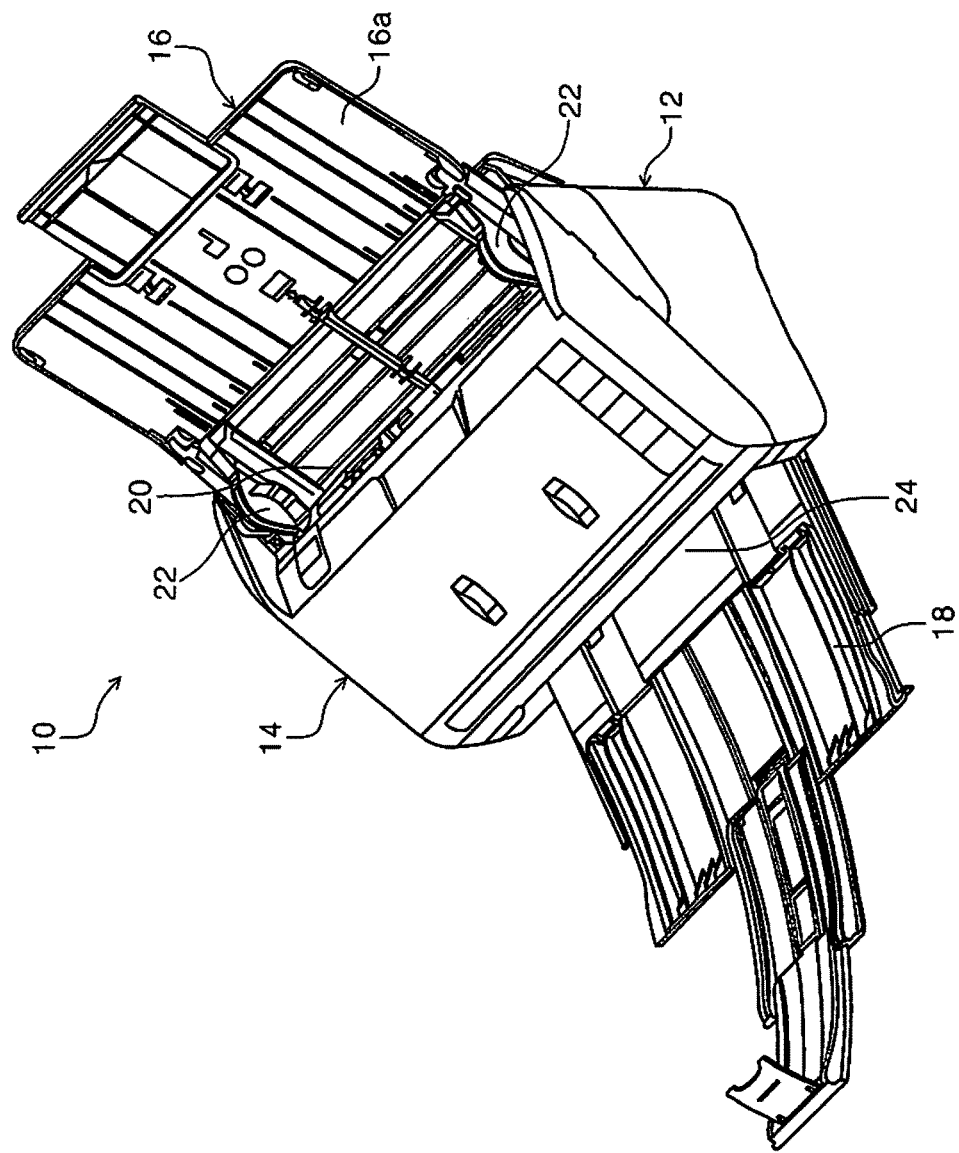
FIG. 1 is an external perspective view of an image reading apparatus according to the invention.

Hereinafter, a description will be given of an embodiment of the invention with reference to the drawings. Regarding configurations which are the same in the examples, the same reference numerals will be given, a description will be given only in the first example, and the description of the configurations will be omitted in the following examples.

Figure 2:
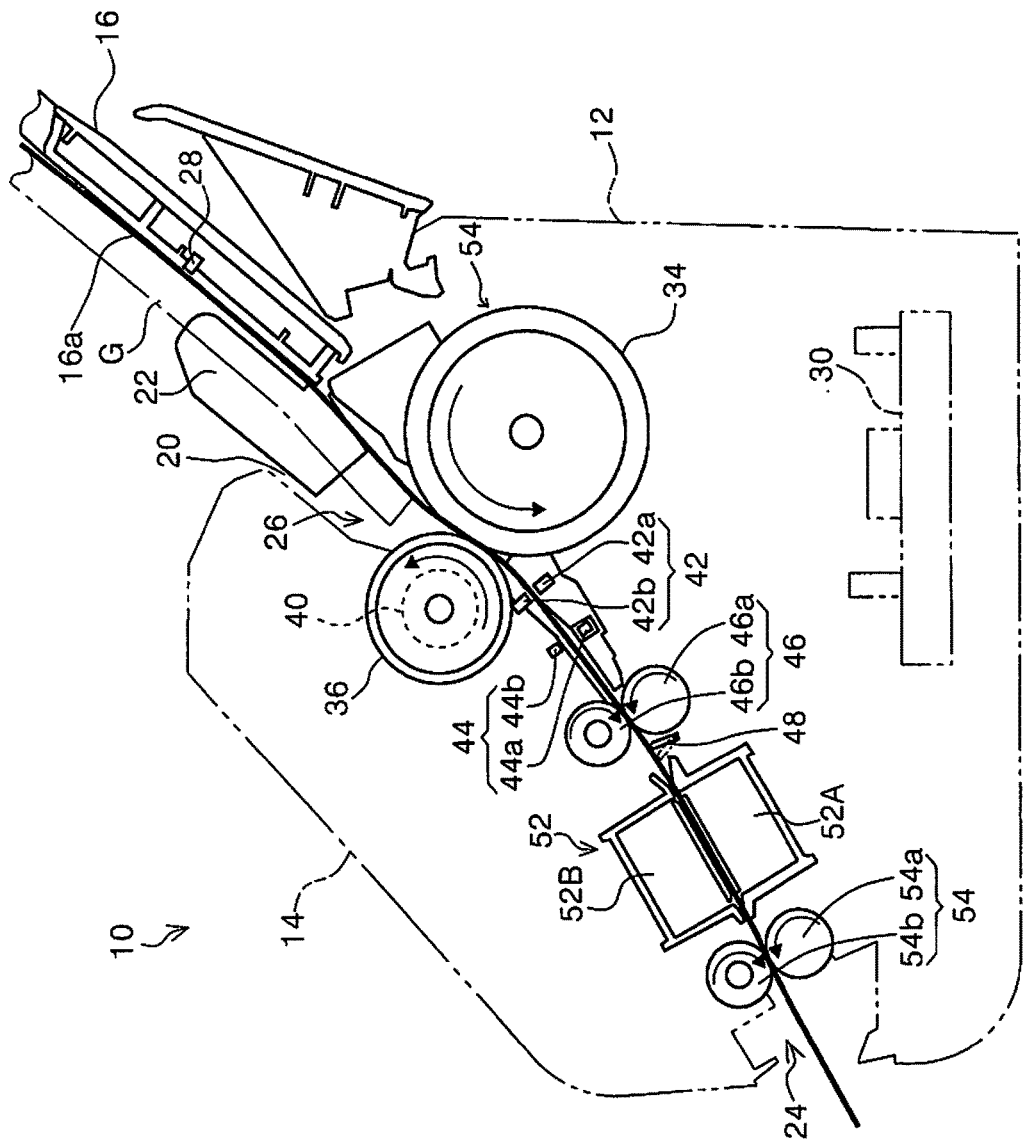
FIG. 2 is a side view illustrating a document feed path of the image reading apparatus according to the invention.
Figure 3:
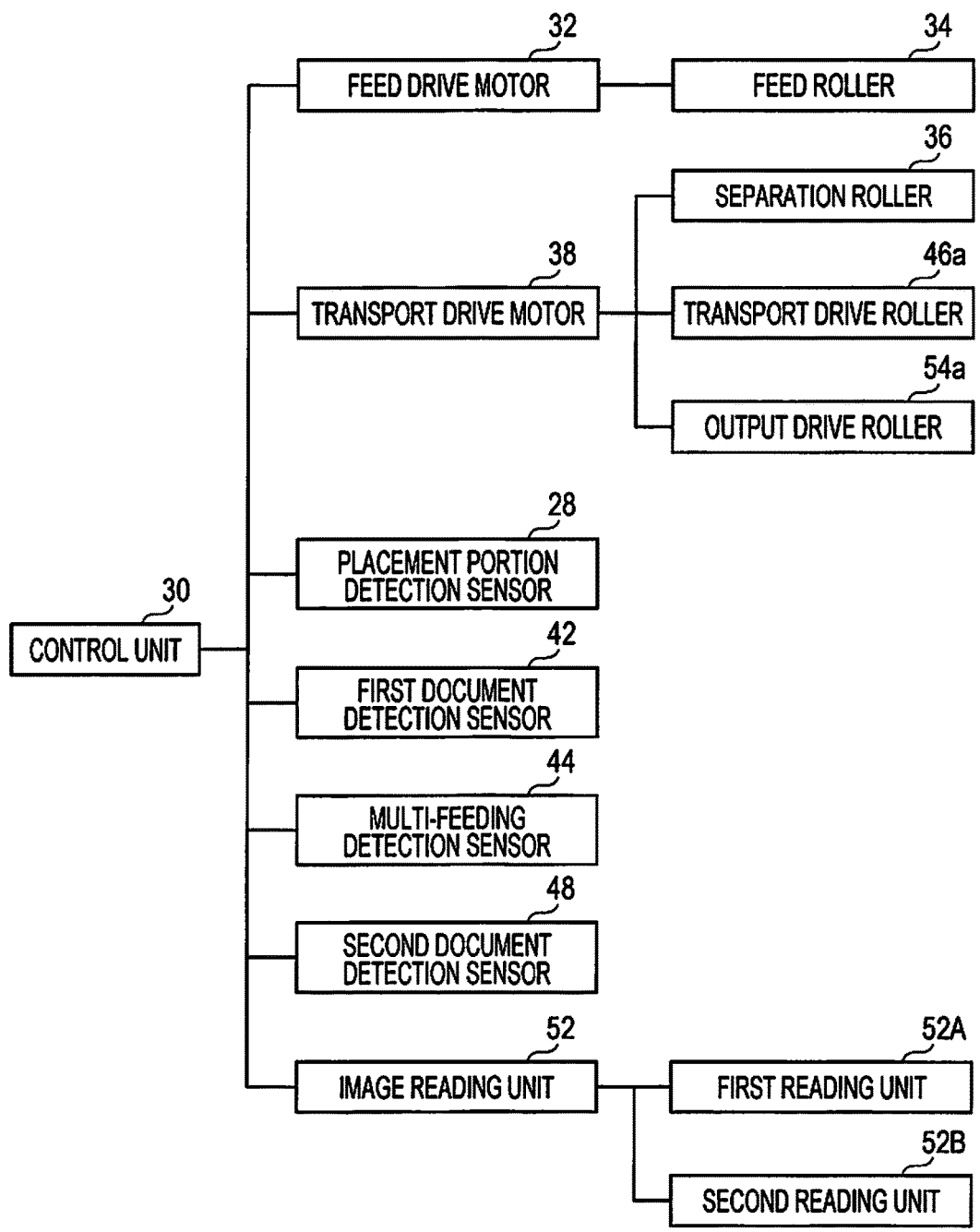
FIG. 3 is a block diagram of the constituent elements which configure the image reading apparatus.
Figure 4:
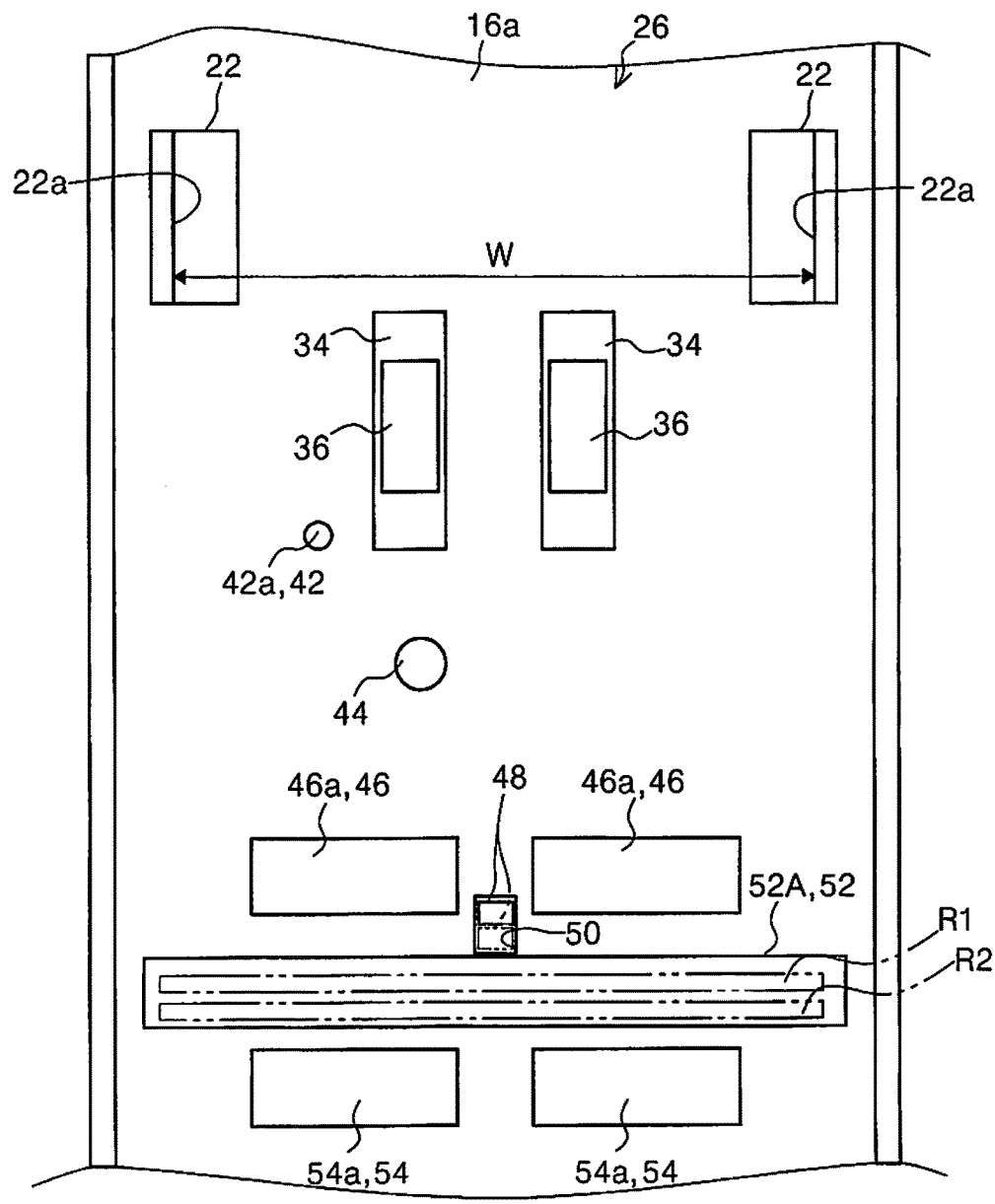
FIG. 4 is a diagram schematically illustrating the document feed path of the image reading apparatus according to a first example.
Figure 5:
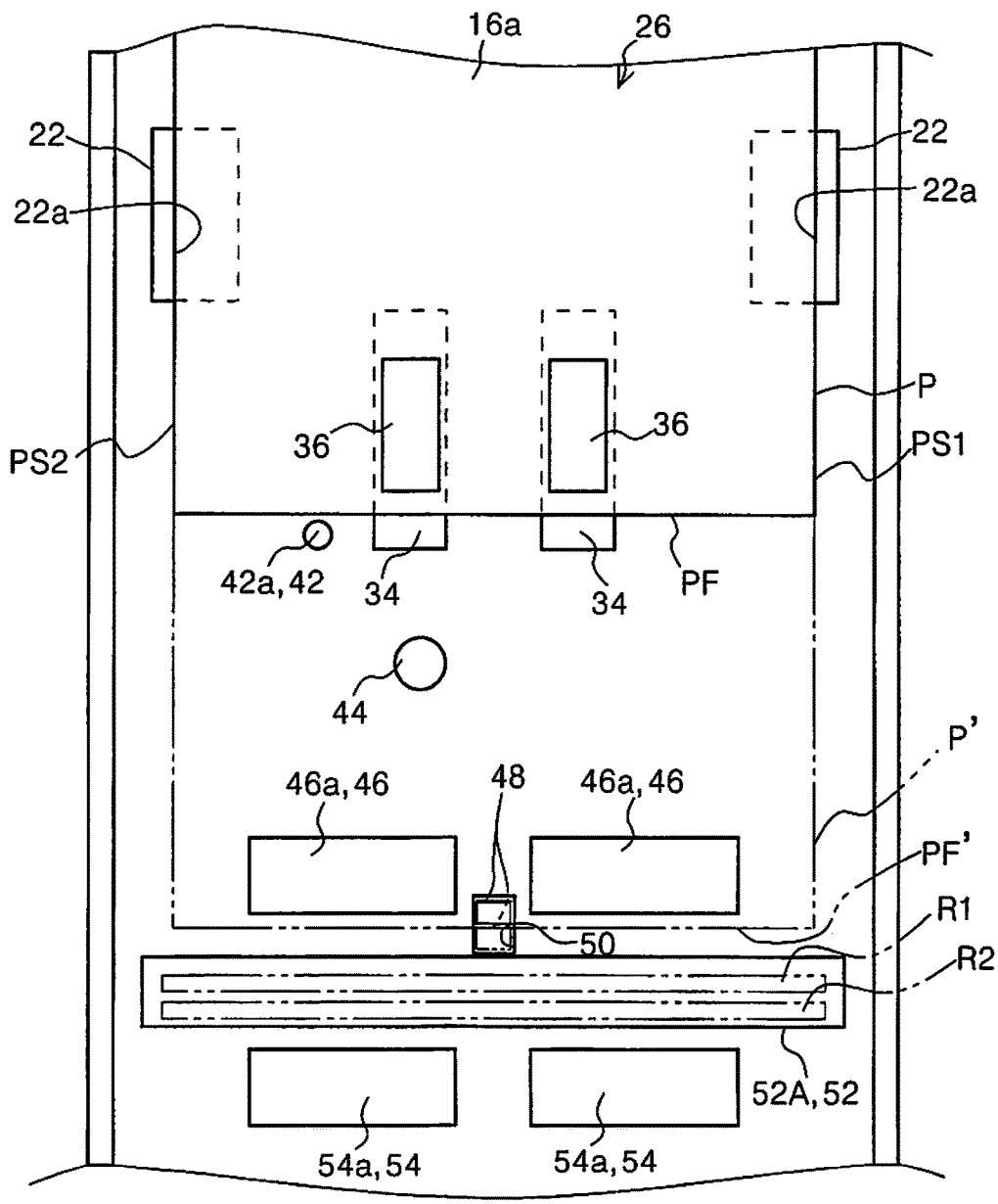
FIG. 5 is a diagram schematically illustrating the document feed path of the image reading apparatus according to the first example and illustrating an ordinary feeding state.

FIG. 1 is an external perspective view of an image reading apparatus according to the invention, FIG. 2 is a side view illustrating a document feed path of the scanner according to the invention, FIG. 3 is a block diagram of the constituent elements which configure the image reading apparatus, FIG. 4 is a diagram schematically illustrating the document feed path of the image reading apparatus according to a first example, and FIG. 5 is a diagram schematically illustrating the document feed path of the image reading apparatus according to the first example and illustrating an ordinary feeding state.

Figure 6:
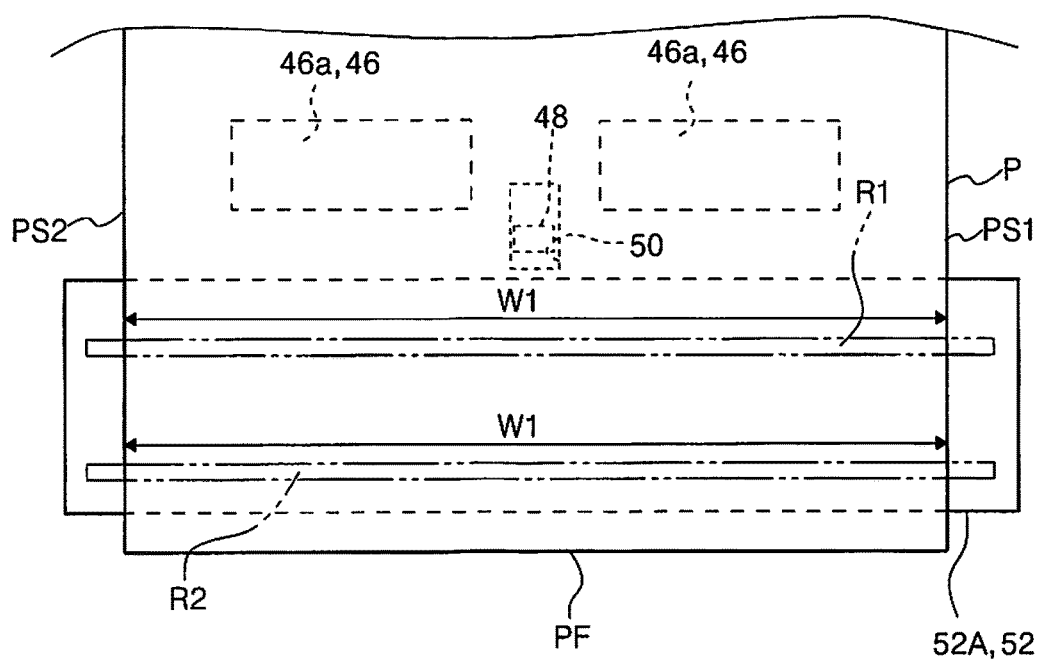
FIG. 6 is a diagram illustrating the ordinary feeding state in an image reading unit according to the first example.
Figure 8:
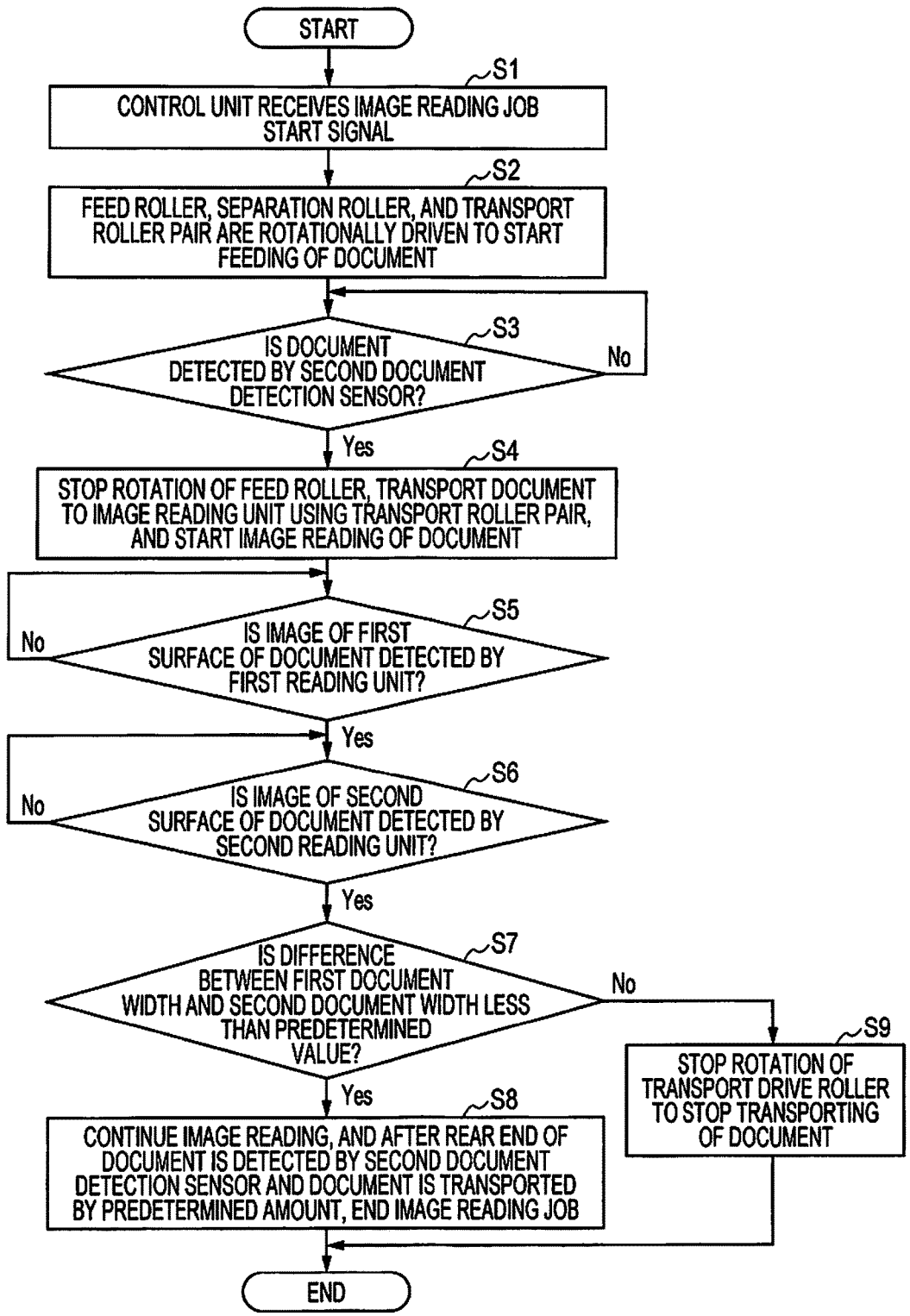
FIG. 8 is a flowchart of feed control in the image reading unit according to the first example.
Figure 10:
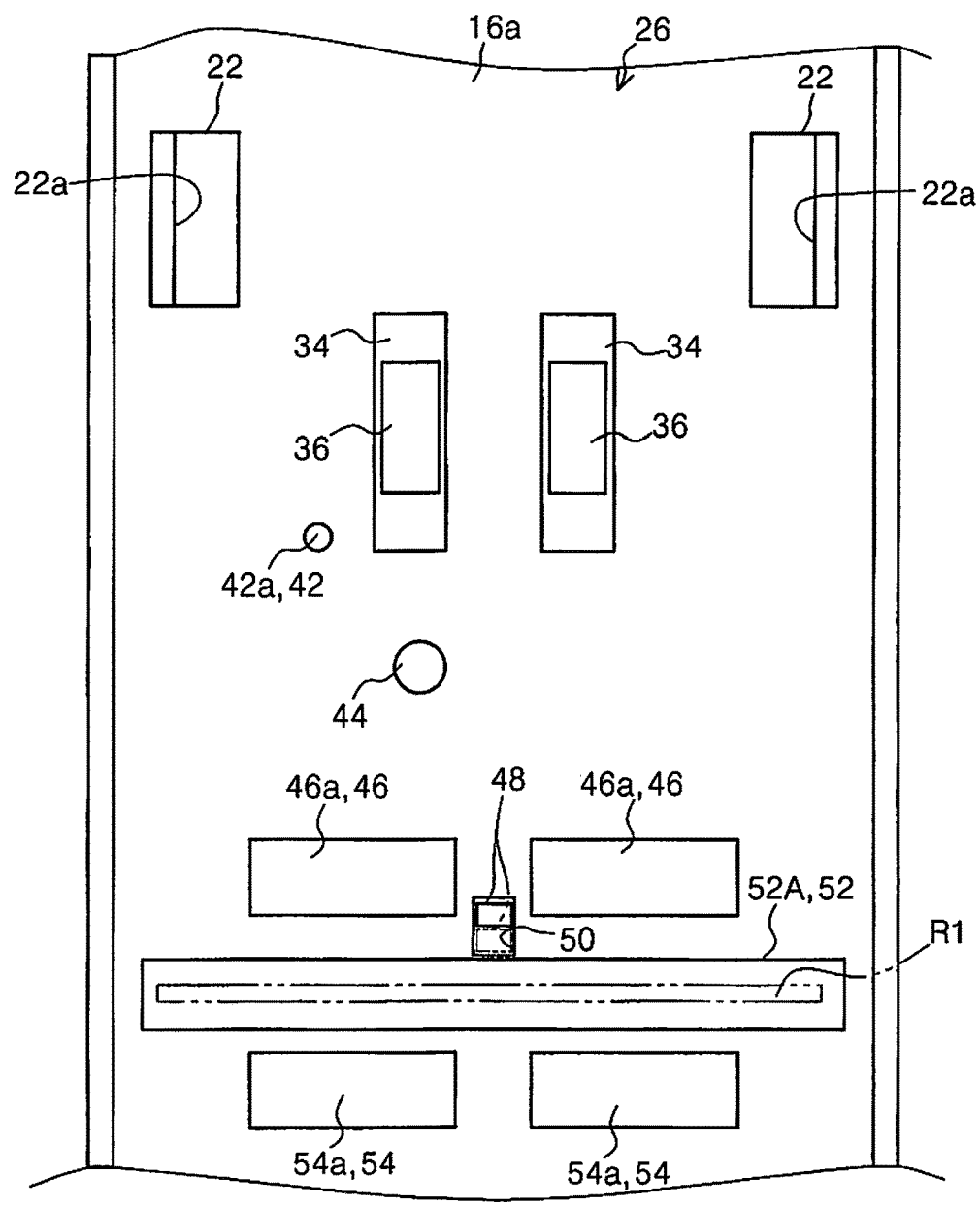
FIG. 10 is a diagram schematically illustrating a document feed path of an image reading apparatus according to a second example.

FIG. 6 is a diagram illustrating the ordinary feeding state in an image reading unit according to the first example, FIG. 7 is a diagram illustrating a state in which paper jamming is detected in the image reading unit according to the first example, FIG. 8 is a flowchart of feed control in the image reading unit according to the first example, FIG. 9 is a diagram illustrating a state in which skewing is detected in the image reading unit according to the first example, FIG. 10 is a diagram schematically illustrating a document feed path of an image reading apparatus according to a second example, FIG. 11 is a diagram illustrating a state in which paper jamming is detected in an image reading unit according to the second example.

Figure 15:
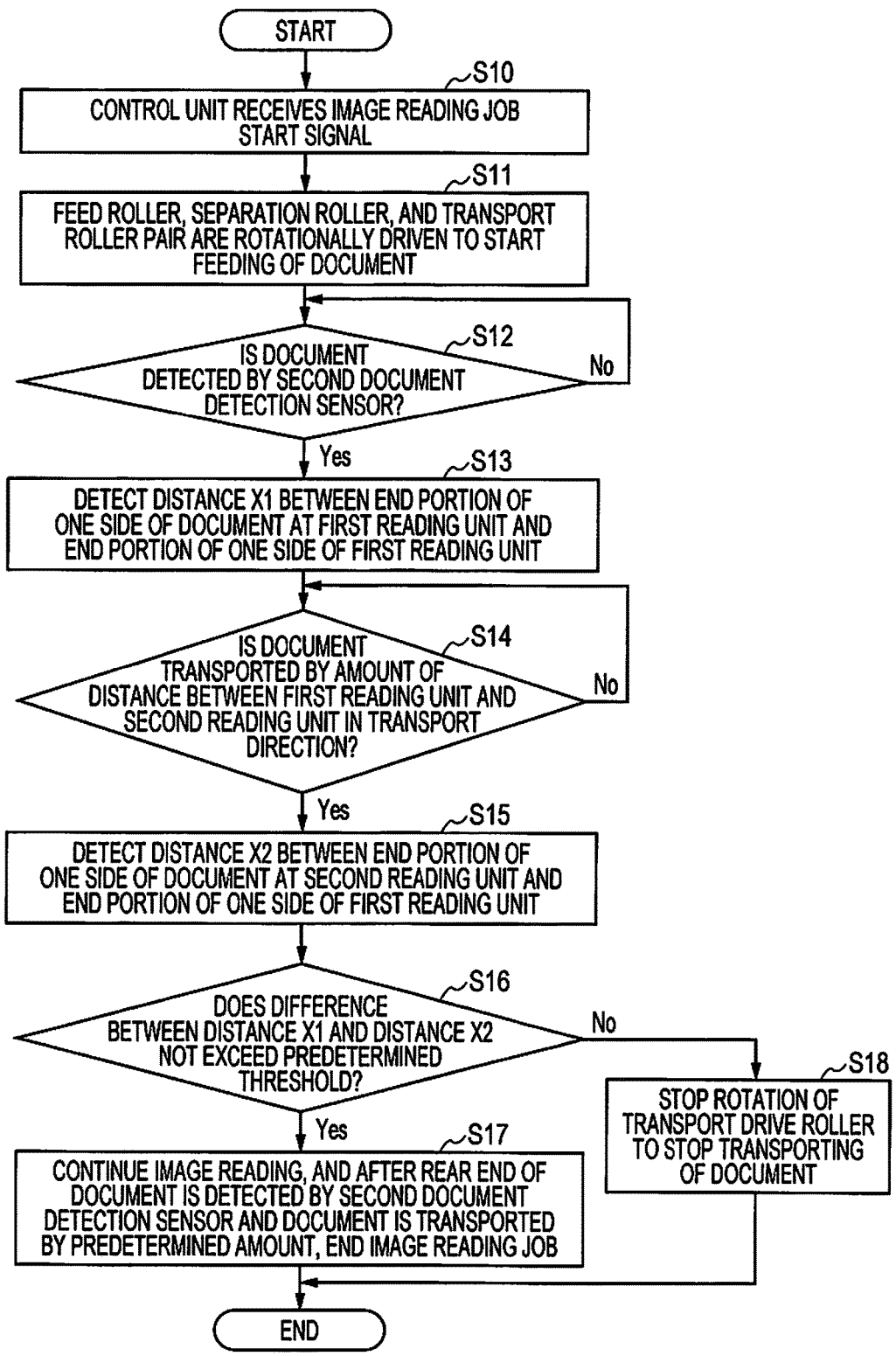
FIG. 15 is a flowchart of feed control in the image reading unit according to the third example.

FIG. 12 is a diagram illustrating an ordinary feeding state in an image reading unit according to a third example, FIG. 13 is a diagram illustrating a state in which oblique motion occurs in the image reading unit according to the third example, FIG. 14 is a diagram illustrating a state in which skewing occurs in the image reading unit according to the third example, FIG. 15 is a flowchart of feed control in the image reading unit according to the third example, FIG. 16 is a diagram illustrating an ordinary feeding state in an image reading unit according to a fourth example, FIG. 17 is a diagram illustrating a state in which skewing occurs in the image reading unit according to the fourth example, and FIG. 18 is a diagram illustrating a state in which skewing occurs in the image reading unit according to the fourth example.

In the X-Y-Z coordinate system illustrated in the drawings, an X direction indicates an apparatus width direction and a paper width direction, a Y direction indicates a paper transport direction in the image reading apparatus, and a Z direction indicates a direction perpendicular to the Y direction which is a direction which is substantially perpendicular to the surface of the paper which is transported. In the drawings, the +Y direction side is the apparatus front side, and the −Y direction side is the apparatus rear surface side.

First Example

Outline of Invention

In the basic concept of the present example, an image of a document P is read in an image reading unit of a scanner 10 which serves as the "image reading apparatus", determination of whether the document P is causing paper jamming inside the document transport path is determined based on image information which is read, and the necessary feed control is performed in a case in which the document P is causing paper jamming.

Regarding Image Reading Apparatus

Referring to FIGS. 1 and 2, the scanner 10 is provided with a bottom unit 12, a top unit 14, a cover portion 16, and an output tray 18. In the present example, although not illustrated, the top unit 14 is attached to the bottom unit 12 to be capable of rotationally moving with respect to the bottom unit 12 using the paper transport direction downstream side as a fulcrum.

The cover portion 16 is attached to the top portion of the rear surface side of the bottom unit 12 to be capable of rotationally moving with respect to the bottom unit 12. The cover portion 16 is capable of adopting a non-feeding state (not illustrated) in which the cover portion 16 covers the top portion and a feed port 20 of the top unit 14, and a feeding-capable state in which the cover portion 16 rotationally moves to the apparatus rear surface side as illustrated in FIG. 1 and opens the feed port 20. As illustrated in FIG. 1, when the cover portion 16 enters the feeding-capable state, the reverse surface of the cover portion 16 functions as a document placement portion 16*a* on which the document P is placed.

An output port 24 which outputs the document P is provided on the apparatus front side of the bottom unit 12. The bottom unit 12 is provided with the output tray 18 which can be pulled out from the output port 24 toward the apparatus front side. The output tray 18 is capable of adopting a state in which the output tray 18 is stored in the base portion of the bottom unit 12 (not illustrated) and a state in which the output tray 18 is pulled out to the apparatus front side (refer to FIG. 1). In the present embodiment, the output tray 18 is configured by connecting a plurality of tray members and it is possible to adjust the pull-put length from the output port 24 according to the length of the document P which is outputted.

Regarding Document Transport Path in Scanner

Next, a description will be given of a document transport path 26 in the scanner 10 with reference to FIGS. 2 to 4. In FIG. 2, only the outlines of the housings of the bottom unit 12 and the top unit 14 are illustrated by virtual lines. In FIG. 2, the thick solid line to which the reference numeral P is given illustrates the guide path of the document which is transported along the document transport path 26 inside the scanner 10.

In the present example, the document P which is set in the feed port 20 is placed to be supported by the reverse surface of the cover portion 16 which adopts a pose of being rotationally moved to the apparatus rear surface side with respect to the bottom unit 12, that is, is supported by the document placement portion 16a. It is possible to set multiple documents P in the feed port 20. A placement portion detection sensor 28 is provided on the document placement portion 16a. For example, the placement portion detection sensor 28 is configured as a touch sensor having a lever or the like or an optical sensor, and when the document P is set in the document placement portion 16a, the placement portion detection sensor 28 transmits a detection signal to a control unit 30 (described later). It is possible to set multiple documents P in the document placement portion 16a.

In the present example, as illustrated in FIG. 4, a pair of edge guides 22 is provided on the document placement portion 16a. The edge guides 22 are configured to be capable of moving in a direction approaching or separating from each other in the apparatus width direction in FIG. 4. When the document P is set in the document placement portion 16a, guide surfaces 22a of the edge guides 22 are caused to contact the side portions of the document P in the apparatus width direction and the edge guides 22 are moved to a position which restricts the position of the document P in the apparatus width direction to hold the side portions of the document P. Accordingly, the edge guides 22 guide the feeding of the document P. The edge guides 22 which are illustrated in FIG. 4 are in a state of being most separated in the apparatus width direction, that is, the width direction of the document P.

Here, referring to FIG. 4, a document transporting region W is set as a region between the guide surfaces 22a of the pair of edge guides 22 in the most separated state in the apparatus width direction. Specifically, the document transporting region W is set to the width of the maximum size of document P that it is possible to feed in the scanner 10.

In the documents P which are placed on the document placement portion 16a, the document P which is placed bottommost is fed to the feeding direction downstream side by feed rollers 34 which are rotationally driven by a feed drive motor 32 (refer to FIG. 3). As illustrated in FIG. 4, for example, two feed rollers 34 are provided at an interval in the apparatus width direction. The outer circumferential surfaces of the feed rollers 34 are configured using a high friction material (for example, an elastomer such as rubber).

In FIG. 2, the reference numeral G illustrates a stack of the documents P which are placed (set) on the document placement portion 16a. The leading end of the document group G is held at a feed standby position (the position of FIG. 2) by a stopper (not illustrated) before the start of the feeding and the entrance of the document group G to the space between the feed rollers 34 and separation rollers 36 is restricted.

As illustrated in FIG. 2, the separation rollers 36 are provided at positions facing the feed rollers 34. As illustrated in FIG. 4, there are also two separation rollers 36 provided at positions corresponding to the feed rollers 34 in the apparatus width direction. The separation rollers 36 are provided in a state of being biased with respect to the feed rollers 34 by biasing units (not illustrated). The separation rollers 36 are driven to rotate in a reverse direction (the counterclockwise direction in FIG. 2) from the rotation direction of the feed rollers 34 (the counterclockwise direction in FIG. 2, that is, the direction in which the document is fed to the downstream side) by a transport drive motor 38 (refer to FIG. 3). In the present example, the outer circumferential surfaces of the separation rollers 36 are configured using a high friction material (for example, an elastomer such as rubber) in the same manner as the feed rollers 34.

In the present example, the separation rollers 36 are provided with torque limiters 40. The separation rollers 36 are configured to receive the drive torque of the transport drive motor 38 via the torque limiters 40.

Here, when the rotational torque which is received from the feed rollers 34 exceeds the limit torque of the torque limiters 40, the separation rollers 36 are cut away from the drive system of the transport drive motor 38 by the torque limiters 40 and are driven to rotate by the feed rollers 34 (the clockwise direction in FIG. 2).

When the feeding of the document P is started and multiple documents P enter the space between the feed rollers 34 and the separation rollers 36, the separation rollers 36 stop receiving rotational torque from the feed rollers 34 and the rotation driven by the feed rollers 34 stops. The separation rollers 36 receive the driving force of the transport drive motor 38 via the torque limiters 40 and start rotating in the reverse direction from the feed rollers 34 (the counterclockwise direction in FIG. 2). Accordingly, the upper documents P (the documents P for which multi-feeding is to be prevented) excluding the bottommost document P to be fed do not receive the transport force for proceeding to the downstream side and are returned to the transport direction upstream side by the rotation of the separation rollers 36. Accordingly, the multi-feeding of the document P is prevented. Since the bottommost document P to be fed is directly in contact with the feed rollers 34, the document P proceeds to the downstream side due to the transport force which is received from the feed rollers 34.

Next, a first document detection sensor 42 which detects the feeding of the document P is provided on the downstream side of the feed rollers 34 and the separation rollers 36 in the document transport path 26. As illustrated in FIG. 4, the first document detection sensor 42 is disposed inside the transporting region W of the document P of the maximum size which can be fed in the apparatus width direction of the document transport path 26, for example. The first document detection sensor 42 is configured as an optical sensor, for example, and is provided with a light emitting unit 42a and a light receiving unit 42b. The light emitting unit 42a and the light receiving unit 42b are disposed at positions facing each other to interpose the document transport path 26. When the document P is transported in the document transport path 26, a configuration is adopted in which the document P is detected due to the document P blocking detection light from the light emitting unit 42a. When the first document detection sensor 42 detects the document P, the first document detection sensor 42 transmits a detection signal to the control unit 30.

Once again, referring to FIG. 2, a multi-feeding detection sensor 44 which detects multi-feeding of the document P is disposed on the transport direction downstream side of the first document detection sensor 42 in the document transport path 26. As illustrated in FIG. 4, the multi-feeding detection sensor 44 is disposed inside the document transporting region W in the apparatus width direction. In the present example, the multi-feeding detection sensor 44 is configured as an ultrasonic wave sensor which is provided with a speaker unit 44a and a microphone unit 44b. The multi-feeding detection sensor 44 is configured to emit ultrasonic waves from the speaker unit 44a toward the document P which passes through the document transport path 26 and to detect a reflected sound from the document P using the microphone unit 44b. In the present example, the multi-feeding detection sensor 44 is configured not only to detect multi-feeding of the document P using the frequency of the reflected sound but also to be capable of detecting the paper type such as card.

A transport roller pair 46 which serves as the "transport rollers" is provided on the transport direction downstream side of the multi-feeding detection sensor 44 in the document transport path 26. As illustrated in FIG. 4, two transport roller pairs 46 (transport drive rollers 46a) are provided at an interval in the apparatus width direction. The transport roller pair 46 is provided with the transport drive roller 46a and a transport driven roller 46b which is rotationally driven by the transport drive roller 46a. In the present example, the transport drive roller 46a is rotationally driven by the transport drive motor 38.

A second document detection sensor 48 is provided on the transport direction downstream side of the transport roller pair 46 in the document transport path 26. The second document detection sensor 48 is configured as a touch sensor having a lever, for example. The lever-shaped second document detection sensor 48 is disposed inside an opening portion 50 which is provided on the bottom unit 12 side of the document transport path 26. The leading end of the lever-shaped second document detection sensor 48 is configured to protrude from the opening portion 50 in a non-detection state of the document P.

When the document P is transported along the document transport path 26, the lever of the second document detection sensor 48 is pushed by the leading end of the document P, rotationally moves to the transport direction downstream side, and is pushed into the opening portion 50 (refer to the double-dot-dashed line portions in FIGS. 2 and 4). Accordingly, the second document detection sensor 48 detects the document P. When the second document detection sensor 48 detects the document P, the second document detection sensor 48 transmits a detection signal to the control unit 30. The document P is transported to the transport direction downstream side in a state in which the document P pushes the second document detection sensor 48 into the opening portion 50.

An image reading unit 52 which serves as a "reader" is provided on the downstream side of the second document detection sensor 48. Here, the image reading unit 52 is provided with a first reading unit 52A and a second image reading unit 52B. The first reading unit 52A is provided on the bottom unit 12 to face the bottom surface, that is, the first surface of the document P which is transported along the document transport path 26 and the second reading unit 52B is provided on the top unit 14 to face the top surface, that is, the second surface of the document P which is transported along the document transport path 26. In the present example, the first reading unit 52A and the second reading unit 52B are configured as reading units and, for example, are configured as contact image sensor modules (CISM).

Here, referring to FIG. 4, the reading region of the image sensor in the first reading unit 52A is illustrated by the double-dot-dashed line portion which is given the reference numeral R1. The reading region of the image sensor in the second reading unit 52B is illustrated by the double-dot-dashed line portion which is given the reference numeral R2. As illustrated in FIG. 4, the reading region R2 of the second reading unit 52B is positioned on the transport direction downstream side of the reading region R1 of the first reading unit 52A on the document transport path 26. In other words, in the present example, a configuration is adopted in which, after reading the first surface of the document P in the reading region R1 of the first reading unit 52A, the second surface of the document P is read in the reading region R2 of the second reading unit 52B.

In FIG. 4, the reading region R2 is illustrated inside the first reading unit 52A to facilitate the description of the positional relationship with the reading region R1; however, in actuality, the reading region R2 is provided inside the second reading unit 52B which is provided above the first reading unit 52A.

After the image of at least one of the first surface and the second surface of the document P is read in the image reading unit 52, the document P is nipped by the output roller pair 54 which is positioned on the transport direction downstream side of the image reading unit 52 and is output from the output port 24.

In the present example, the output roller pair 54 is provided with an output drive roller 54a and an output driven roller 54b which is rotationally driven by the output drive roller 54a. In the present example, the output drive roller 54a is rotationally driven by the transport drive motor 38. The transport drive roller 46a and the output drive roller 54a are configured to be rotationally driven by the transport drive motor 38 which is a shared drive source; however, the transport drive roller 46a and the output drive roller 54a may be configured to be individually rotationally driven by separate drive sources.

The control unit 30 (refer to FIG. 2) is provided inside the bottom unit 12. In the present example, the control unit 30 is configured as an electrical circuit which is provided with a plurality of electronic components. The control unit 30 receives the detection signals of the placement portion detection sensor 28, the first document detection sensor 42, the multi-feeding detection sensor 44, and the second document detection sensor 48 and controls the transport drive motor 38 which rotationally drives the feed drive motor 32, the transport drive roller 46a, and the output drive roller 54a which rotationally drive the first reading unit 52A, the second reading unit 52B, and the feed rollers 34.

For example, the control unit 30 is configured to control the transporting and the image reading operation of the document P in the scanner 10. The control unit 30 may control the operations which are necessary for the execution of the document reading operation in the scanner 10 under instruction from the outside (a PC or the like).

Regarding Transporting of Document

Next, a description will be given of the transporting of the document P in the document transport path 26 with reference to FIGS. 5 to 8. Referring to FIG. 8, for step S1, the control unit 30 receives an image reading job start signal. For step S2, the control unit 30 rotationally drives the feed rollers 34, the separation rollers 36, and the transport roller pair 46 (the transport drive roller 46a) and starts the feeding of the document P (refer to the document P illustrated by the solid line in FIG. 5). Edges PS1 and PS2 of the document P are guided by the edge guide 22 and the document P is fed to the downstream side of the document transport path 26. The document P which is fed to the downstream side is detected by the first document detection sensor 42 and the multi-feeding detection sensor 44.

For step S3, the control unit 30 determines whether or not the second document detection sensor 48 detects the document P. Specifically, a leading end PF' of a document P' which is fed to the transport direction downstream side of the multi-feeding detection sensor 44 (refer to the double-dot-dash portion which is given the reference numeral P' in FIG. 5) contacts the second document detection sensor 48 and the leading end PF' of the document P' presses the second document detection sensor 48 to the transport direction downstream side. As a result, the lever-shaped second document detection sensor 48 rotationally moves to the transport direction downstream side, is pushed into the opening portion 50, and detects the leading end PF' of the document P'.

Here, in a case in which the second document detection sensor 48 does not detect the leading end PF' of the document P', the control unit 30 continues step S3 while continuing the transporting of the document P' to the transport direction downstream side. In a case in which the second document detection sensor 48 detects the leading end PF' of the document P', for step S4, the control unit 30 stops the rotation of the feed rollers 34 and starts the image reading of the document P in the image reading unit 52. Here, as illustrated in FIG. 5, that the second document detection sensor 48 detects the leading end PF' of the document P' means that the document P' is nipped by the transport roller pair 46. Therefore, the document P' is transported toward the image reading unit 52 by the transport roller pair 46 and the image reading of the document P' is performed by the image reading unit 52.

Here, a description will be given of the image reading of the document P in the image reading unit 52 with reference to FIG. 6. When the document P is fed to the image reading unit 52, the document P first reaches the reading region R1 of the first reading unit 52A which is positioned on the transport direction upstream side in the image reading unit 52. An image of the first surface of the document P is then read in the reading region R1 while the document P is being fed to the transport direction downstream side.

For step S5, the control unit 30 determines whether or not the first reading unit 52A detects the image of the first surface of the document P. In a case in which the first reading unit 52A does not detect the image of the first surface of the document P, step S5 is continued while the transporting of the document P to the transport direction downstream side is continued. In a case in which the first reading unit 52A detects the image of the first surface of the document P, the control unit 30 transitions from step S5 to step S6.

The document P is fed to the reading region R2 of the second reading unit 52B which is positioned further on the downstream side of the reading region R1 while the image is being read in the reading region R1 of the first reading unit 52A. In the reading region R2, an image of the second surface of the document P of the opposite side from the first surface of the document P.

For step S6, the control unit 30 determines whether or not the second reading unit 52B (refer to FIG. 2) detects an image of the second surface of the document P. In a case in which the second reading unit 52B does not detect the image of the second surface of the document P, step S6 is continued while the transporting of the document P to the transport direction downstream side is continued. In a case in which the second reading unit 52B detects the image of the second surface of the document P, the control unit 30 transitions from step S6 to step S7.

Here, the first reading unit 52A and the second reading unit 52B are configured as contact image sensor modules (CISM), for example, and are configured to irradiate the document P with light and detect edges of the document or image information according to the strength of the detected light which is reflected from the document P.

For step S7, as an example of the process, given a distance between the edge PS1 of one side and the edge PS2 of the other side in the apparatus width direction of the document P which is read by the first reading unit 52A and a distance between the edge PS1 of one side and the edge PS2 of the other side of the document P which is read by the second reading unit 52B, the control unit 30 determines whether or not a difference between the two distances is less than a predetermined value. In other words, the control unit 30 detects whether there is a change in the width of the document P between the upstream side and the downstream side in the transport direction of the document P.

Here, in the image reading unit 52, an image of the document P is read while the document P passes between the reading surface (a glass surface) of the first reading unit 52A and the reading surface (a glass surface) of the second reading unit 52B from the transport direction upstream side toward the downstream side. The reading surface (the glass surface) of the first reading unit 52A and the reading surface (the glass surface) of the second reading unit 52B are disposed to face each other in a direction intersecting the document transport path 26 leaving a distance therebetween at which it is possible to read an image of the document P while allowing the document P to pass. When the document P passes between the first reading unit 52A and the second reading unit 52B, the width of the document P may fluctuate due to a portion of the document P lifting up from at least one reading surface of the first reading unit 52A and the second reading unit 52B or a portion of the document bending in the apparatus width direction in a range of the distance between the reading surfaces of both of the units 52A and 52B. Therefore, the predetermined value of the present example is set to a greater value than the fluctuation amount of the document P caused by the distance between the reading surface (the glass surface) of the first reading unit 52A and the reading surface (the glass surface) of the second reading unit 52B of the image reading unit 52. For example, the predetermined value is set to approximately several mm, specifically, 1 mm.

For example, as illustrated in FIG. 6, the document P is ordinarily transported in the image reading unit 52, and images of the first surface and the second surface are read in the first reading unit 52A and the second reading unit 52B. The control unit 30 is capable of identifying the positions of both edges PS1 and PS2 of the document P from the detection strength of the reflected light in the reading region R1 and the reading region R2, and is capable of obtaining the distance between both edges PS1 and PS2 which are identified.

When the document P is ordinarily transported, the distance between the edges PS1 and PS2 of the document P in the reading region R1, that is, a first document width becomes W1, and the distance between the edges PS1 and PS2 of the document P in the reading region R2, that is, a second document width becomes W1. In other words, it can be understood that the difference between the first document width and the second document width is less than the predetermined value.

Therefore, since the difference between the first document width and the second document width is less than the predetermined value, the control unit 30 transitions to step S8. For step S8, after the rear end of the document P is detected by the second document detection sensor 48 and the document P is transported by a predetermined amount, that is, until the rear end of the document P leaves the image reading unit 52, the control unit 30 outputs the document P to the output tray 18 and ends the image reading job.

Next, a description will be given of a case in which the difference between the first document width and the second document width is greater than or equal to the predetermined value in step S7 with reference to FIG. 7. In a case in which the thickness of a document P1 is thin, the rigidity of the document P1 is lowered. When the thin document P1 is transported in the document transport path 26, the document P1 may catch on uneven portions in the document transport path 26. When the transporting of the document P1 is continued in this state, jamming (paper jamming) of the document P1 may occur in the document transport path 26 where the portion of the document P1 which catches on the uneven portions acts as a point of origin. For example, when the thin document P1 is transported to the image reading unit 52 after being detected by the second document detection sensor 48, the document P1 may catch on the edge of the transport direction downstream side of the opening portion 50. Alternatively, there is a case in which the document P catches on the transport direction upstream side end portion of the image reading surfaces (the glass surfaces) of the first reading unit 52A and the second reading unit 52B.

The portion of the document P1 which catches on the edge of the opening portion 50 (the apparatus width direction center portion) as illustrated in FIG. 7 becomes a transport resistance, for example, and when the document P1 is transported toward the image reading unit 52, the transporting of the center portion is delayed in comparison to both end portions in the width direction of the document P1, the center portion of the document P1 is crushed, and jamming occurs in the document transport path 26.

Therefore, the form of the document P1 which is transported to the image reading unit 52 is different from the form of the document P which is ordinarily transported and is illustrated in FIG. 6. For example, a form is assumed in which the document width narrows toward a leading end PF1 as illustrated in the document P1. Here, the document P1 passes the reading region R1 and is transported to the reading region R2 without jamming being detected. The first reading unit 52A reads the first document width of the document P1 in the reading region R1. The control unit 30 recognizes that the first document width is W2 in the document P1. Next, the second reading unit 52B reads the second document width of the document P1 in the reading region R2. The control unit 30 recognizes that the second document width is W3 in the document P1. Here, the width W2 and the width W3 are in a relationship of W2>W3.

For step S7, in a case in which the control unit 30 determines that the difference between the first document width W2 and the second document width W3 is greater than or equal to the predetermined value in the document P1, that is, in a case in which the control unit 30 determines that jamming occurs in the document P1, the control unit 30 transitions to step S9. The control unit 30 stops the rotation of the transport drive roller 46a and, assessing the situation as an error, stops the image reading job.

In the present example, after the second document detection sensor 48 detects the leading end PF1 of the document P1, it is possible to perform jamming determination based on the image data which is read at the points in time at which each of the images of the document P are read in the reading regions R1 and R2 and to stop the transporting of the document. In other words, it is possible to perform the jamming detection of the document P1 before stopping the transport roller pair 46 after the transport roller pair 46 is driven for the predetermined time, which is set based on the document length, after the passing of the leading end PF of the document P1 is detected by the second document detection sensor 48 and it is possible to suppress damage formation to the document P1 that accompanies jamming.

Modification Example of First Example (1) In the present example, a configuration is adopted in which in a case in which the difference between the first document width and the second document width is greater than or equal to the predetermined value in the document P, it is determined that jamming is occurring; however, instead of this configuration, for example, the degree of inclination of the edges PS1 and PS2 of the document P which is read by the first reading unit 52A and the second reading unit 52B with respect to the transport direction or whether or not a portion of the document P is missing in the reading region R1 and the reading region R2 may be used as conditions of the jamming determination.

A description will be given of the state in which a portion of the document P is missing. As illustrated in FIG. 7, when the document P1 is transported to the image reading unit 52 in a state in which the center portion of the document P1 is crushed, a state in which a portion of the document P1 at the positions corresponding to the reading region R1 and the reading region R2 is missing, that is, a state in which a missing portion PL is formed is assumed. In this state, when an image of the document P1 is read by the first reading unit 52A and the second reading unit 52B, edges PL1 and PL2 corresponding to the missing portion PL are detected from the read image data. In other words, since the control unit 30 detects the edges PL1 and PL2 which are not detected in a case in which the document P is ordinarily transported, it is possible to determine the state in which the document P1 between the edge PL1 and the edge PL2 in the apparatus width direction is missing. Therefore, the control unit 30 is capable of determining that jamming is occurring in the document P1.

(2) In the present example, a case is given in which the jamming occurs in the document P with the point of origin at the opening portion 50, for example; however, for example, as illustrated in FIG. 9, there is a case in which the document P is transported to the image reading unit 52 while skewing (oblique motion) is still occurring and a case in which, as a result of skewing occurring in the document P, the document P touches the walls of the document transport path 26 and jamming occurs. Referring to FIG. 9, when the document P is transported to the image reading unit 52 while skewing is still occurring, as long as there is no deformation or the like of the document P, the first document width which is read by the first reading unit 52A becomes W4 and the second document width which is read by the second reading unit 52B becomes W4, and thus, since the difference between the first document width and the second document width is less than the predetermined value, jamming is not detected.

Here, for example, the positions of the edge guides 22 are detected by a detection unit (not illustrated), the distance between the edge guides 22 is calculated, and the calculated distance is assumed to be the width of the document P. When the control unit 30 compares the first document width W4 and the second document width W4 to the calculated distance between the edge guides 22 (the width of the document P), since the first document width W4 and the second document width W4 are greater than the distance between the edge guides 22, it is possible to determine that skewing of the document P is occurring. Therefore, it is possible to detect not only the jamming of the document P but also the skewing.

Alternatively, when an edge detection position of the document P in the reading region R1 of the first reading unit 52A is compared to the edge detection position of the document P in the reading region R2 of the second reading unit 52B, the control unit 30 is capable of detecting that the edge detection position deviates in the apparatus width direction. Therefore, by also using the deviation of the edge detection position in the apparatus width direction as a determination condition, it is possible to detect not only the jamming of the document P but also the skewing of the document P.

(3) In a case in which the first document width of the document P when the document P is read by the first reading unit 52A is less than or equal to a set value, for example, in a case in which the document P is card, a setting may be adopted in which the image reading operation in the image reading unit 52 is continued in this state. Here, card refers to card as defined by the international standard ISO/IEC7810 "ID-1". The setting value is set to a diagonal line length of the card, for example.

Second Example

Next, a description will be given of the second example with reference to FIGS. 10 and 11. The scanner 10 according to the second example differs from the first example in that the image reading unit 52 is configured by only the first reading unit 52A.

As illustrated in FIG. 10, the image reading unit 52 is provided with only the first reading unit 52A. The first reading unit 52A is provided with the reading region R1. Therefore, in this configuration, when the document P is transported to the image reading unit 52, only the bottom surface side, that is, only the first surface of the document P is read.

In the second example, the feed control of the first example, that is, step S6 in the flowchart illustrated in FIG. 8 is omitted and the determination condition of step S7 is set to a different condition from that of the first example. Step S7 in the second example is set to perform determination of whether to continue the image reading (step S8) or whether to stop the transport drive roller 46a (step S9) according to the form of the document P which is read by the first reading unit 52A.

Referring to FIG. 11, a description will be given of the form of the document P which is the determination condition. FIG. 11 illustrates a state in which, when the thin document P1 is transported to the image reading unit 52 after being detected by the second document detection sensor 48, the document P1 catches on the edge of the transport direction downstream side of the opening portion 50 and the transporting to the image reading unit 52 is continued. In other words, FIG. 11 illustrates a state in which the center portion of the document P1 is crushed and jamming occurs in the document transport path 26.

In this state, the document P1 assumes a form in which the document width narrows toward the leading end PF1. The control unit 30 receives the image data of the document P1 which is read by the first reading unit 52A of the image reading unit 52. Since both side portions of the document P1 are inclined to the center side of the document P1, the control unit 30 is capable of determining that the edge PS1 of one side and the edge PS2 of the other side of the document P1 are in a non-parallel state in the image data which is read by the first reading unit 52A. Therefore, the control unit 30 determines that the form of the document P1 which is transported to the image reading unit 52 is not ordinary and determines that jamming is occurring. For step S9, the control unit 30 stops the rotation of the transport drive roller 46a and, assessing the situation as an error, stops the image reading job.

For the form of the document P1, it is set to detect the non-parallel state of both edges of the document P1; however, instead of this configuration, for example, whether or not a portion of the document P1 is missing in the apparatus width direction, that is, in the document width direction in the image data of the document P1 which is read in the reading region R1, that is, whether or not the missing portion PL is formed in the document P1 may be set as the determination condition.

Third Example

Next, a description will be given of the third example with reference to FIGS. 12 to 15. In the scanner 10 according to the third example, in the same manner as in the first example, the image reading unit 52 is configured to include the first reading unit 52A and the second reading unit 52B.

First, a description will be given of the control when the document P is ordinarily fed with reference to FIG. 15. Since steps S10 to S12 in FIG. 15 are the same as steps S1 to S3 in FIG. 8, the description thereof will be omitted. In step S12, the second document detection sensor 48 detects the leading end PF of the document P. Referring to FIG. 12, after a predetermined number of steps elapses from when the second document detection sensor 48 detects the leading end PF of the document P, the reading of the document P in the first reading unit 52A is started.

At this time, for example, the first reading unit 52A detects the end portion of one side of the document P, that is, the end portion of the other side of the document P from the edge PS1, that is, the edge PS2. The control unit 30 acquires a distance X1, a distance Z1, and a distance T1 based on the detection information. The distance X1 is a distance from an end portion of one side of document P (the edge PS1) to the end portion of one side of the first reading unit 52A, the distance Z1 is a distance from the end portion of one side of the document P (the edge PS1) to the end portion of the other side of the document P (the edge PS2), and the distance T1 is a distance from the end portion of the other side of the document P (the edge PS2) to the end portion of the other side of the first reading unit 52A. In other words, for step S13, the distance X1 between the end portion of the one side of the document P (the edge PS1) and the end portion of the one side of the first reading unit 52A is detected by the first reading unit 52A.

Next, for step S14, the control unit 30 transports the document P by a transport amount Y1 to the downstream side in the transport direction. Here, for example, as illustrated in FIG. 12, the transport amount Y1 corresponds to the interval at which the first reading unit 52A and the second reading unit 52B are disposed in the transport direction. In a case in which the transport amount of the document P is less than or equal to Y1, the control unit 30 continues the transporting of the document P to the downstream side in the transport direction. Meanwhile, when the document P is transported to the downstream side in the transport direction by the transport amount Y1, the control unit 30 transitions the process to step S15. Here, in FIG. 12, the leading end PF of the document P is transported to the position of the second reading unit 52B. More specifically, the document P is transported to the position of a dot-dash line which is given the reference numeral PF'.

The document P' is read by the second reading unit 52B. At this time, for example, the second reading unit 52B detects the end portion of one side of the document P', that is, the edge PS1 and the end portion of the other side of the document P', that is, the edge PS2. The control unit 30 acquires a distance X2, a distance Z2, and a distance T2 based on the detection information. The distance X2 is a distance from an end portion of one side of document P' (the edge PS1) to the end portion of one side of the first reading unit 52A, the distance Z2 is a distance from the end portion of one side of the document P' (the edge PS1) to the end portion of the other side of the document P' (the edge PS2), and the distance T2 is a distance from the end portion of the other side of the document P' (the edge PS2) to the end portion of the other side of the first reading unit 52A. In other words, for step S15, the distance X2 between the end portion of the one side of the document P' (the edge PS1) and the end portion of the one side of the second reading unit 52B is detected by the second reading unit 52B.

Next, for step S16, the control unit 30 determines whether or not the difference between the distance X1 which is acquired in step S13 and the distance X2 which is acquired in step S15 exceeds a predetermined threshold. Here, the threshold is set for each size of document P. In consideration of dimensional error of the document P and the error in the reading precision, the threshold is set to a range of approximately 0.5 mm to 1 mm, for example. The threshold is set appropriately according to the size of the document P. Specifically, for example, in a case in which the size of the document P is large, the threshold is set to be small and the detection strength of feeding abnormalities of the document P is set to be high. When the size of the document P is large, there is little leeway in the document width direction in the document transporting region W (refer to FIG. 4), and this is because jamming may occur even under small fluctuations in the document width direction.

Meanwhile, in a case in which the size of the document P is small, the threshold is set to be large and the detection strength of feeding abnormalities of the document P is set to be low. When the size of the document P is small, there is great leeway in the document width direction in the document transporting region W (refer to FIG. 4), and this is because jamming does not occur easily even under fluctuations in the document width direction.

In the present example, as illustrated in FIG. 12, the document P is transported to the downstream side in the transport direction without inclining in a direction which intersects the transport direction. Therefore, the passage position of the edge PS1 of the document P in the first reading unit 52A in the document width direction is approximately the same position as the passage position of the edge PS1 of the document P in the second reading unit 52B. In the same manner, the passage positions of the edge PS2 in the first reading unit 52A and the second reading unit 52B are approximately the same position.

Therefore, since the distance X1 and the distance X2 are approximately the same value, the threshold is not exceeded. As a result, the control unit 30 determines that the document P is ordinarily being transported in the document transport path 26 and transitions the process to step S17. In the present example, the document P is transported to the downstream side in the transport direction without inclining in a direction which intersects the transport direction; however, a state may be assumed in which the document P is transported to the downstream side in the transport direction without undergoing oblique motion in a state of being inclined in the document width direction. In the present example, the term oblique motion is a state in which, when the document P is transported to the downstream side in the transport direction, the document P receives not only the transporting force of the transport direction component but also that of a direction which intersects the transport direction, that is, the transport force in the document width direction and is transported to the downstream side in the transport direction and in the document width direction.

In other words, when the document P is transported to the downstream side in the transport direction without undergoing oblique motion while maintaining the state in which the document is inclined, the reading position of the edge PS1 of the document P in the document width direction which is read by the first reading unit 52A is approximately the same as the reading position of the edge PS1 which is read by the second reading unit 52B. Similarly, the reading position of the edge PS2 of the document P in the document width direction which is read by the first reading unit 52A is also approximately the same as the reading position of the edge PS2 which is read by the second reading unit 52B. Therefore, even if the document P is inclined in the document width direction within a range not exceeding the document transporting region W, as long as the document P does not undergo oblique motion, it is possible to continue the image reading job.

For step S17, the control unit 30 continues the image reading, the second document detection sensor 48 detects the rear end of the document P, the document P is transported by a predetermined amount, and subsequently, the control unit 30 ends the image reading job.

Next, a description will be given of step S18, that is, a feeding abnormality with reference to FIGS. 13 and 14. FIG. 13 illustrates a state in which the document P which is transported undergoes oblique motion while being inclined. In the document P, even if the oblique motion occurs, the positions in the document width direction of the edge PS1 and the edge PS2 change with the transporting of the document P to the downstream side in the transport direction since the document P is displaced in the document width direction. Therefore, the position of the edge PS1 which is read by the first reading unit 52A in the document width direction is different from the position as the position of the edge PS1 which is read by the second reading unit 52B. In other words, the distance X1 between the end portion of one side of the document P (the edge PS1) and the end portion of one side of the first reading unit 52A is a different value from the distance X2 between the end portion of one side of the document P' (refer to the dot-dash line portion) (the edge PS1) and the end portion of one side of the first reading unit 52A. In FIG. 13, the values have the relationship X1>X2.

When the control unit 30 determines that the difference between the distance X1 and the distance X2 exceeds the threshold, the control unit 30 stops the rotation of the transport drive roller 46a, stops the transporting of the document P, and, assessing the situation as an error, ends the image reading job.

Next, FIG. 14 illustrates a state in which the document P which is transported is undergoing rotation (skewing) within the document transport path 26. For example, when the reading of multiple documents P is to be performed, when the documents P are bound at one of the four corners by a staple and the documents P are accidentally set in the scanner 10 in this state (without removing the staple) and the feeding is to be performed, the document P to be fed rotate in a manner which draws an arc centered on the binding position of the staple. As a result, the leading end PF of the document P is displaced in an arc shape toward the downstream side in the transport direction. Specifically, as illustrated in FIG. 14, when the leading end PF is read by the first reading unit 52A, the leading end PF is inclined to the downstream side in the transport direction with respect to the first reading unit 52A and is read. When the document P is transported to the downstream side in the transport direction by the transport amount Y1 while being skewed, since the rotation of the document P becomes even greater, the inclination angle of the leading end PF' (refer to the dot-dash line portion) with respect to the second reading unit 52B when being read by the second reading unit 52B becomes greater than the inclination angle with respect to the first reading unit 52A.

As a result, although the edge PS1 of the document P is detected in the first reading unit 52A, in the second reading unit 52B, the edge PS1 may not be detected and a position in which the leading end PF' crosses the reading region R2 of the second reading unit 52B is detected. Therefore, as illustrated in FIG. 14, the distance X2 increases with respect to the distance X1. In the first reading unit 52A, the distance between the edge PS1 and the edge PS2 of the document P is acquired as Z1. In comparison, in the second reading unit 52B, the distance between the edge PS1 and the edge PS2 is acquired as the distance Z2 which is smaller than the distance Z1 due to the leading end PF inclining.

As a result, when the control unit 30 determines that the difference between the distance X1 and the distance X2 exceeds the threshold, the control unit 30 stops the rotation of the transport drive roller 46a, stops the transporting of the document P, and, assessing the situation as an error, ends the image reading job.

Modification Example of Third Example

In the present example, a configuration is adopted in which a feeding abnormality of the document P is detected according to whether or not the difference between the distance X1 from the end portion of one side of the document P (the edge PS1) to the end portion of one side of the first reading unit 52A and the distance X2 from the end portion of one side of the document P' (the edge PS1) to the end portion of one side of the first reading unit 52A exceeds the threshold; however, the configuration is not limited thereto.

For example, the feeding abnormality of the document P may be determined according to whether or not the difference between the distance Z1 between the end portion of one side of the document P (the edge PS1) which is acquired by the first reading unit 52A and the end portion of the other side of the document P (the edge PS2) and the distance Z2 between the end portion of one side of the document P' (the edge PS1) which is acquired by the second reading unit 52B and the end portion of the other side of the document P' (the edge PS2) exceeds the threshold, and the feeding abnormality of the document P may be determined according to whether or not the difference between the distance T1 from the end portion of the other side of the document P (the edge PS2) to the end portion of the other side of the first reading unit 52A and the distance T2 from the end portion of the other side of the document P' (the edge PS2) and the end portion of the other side of the first reading unit 52A exceeds the threshold.

Alternatively, a configuration may be adopted in which whether or not at least two of the values of X1-X2, Z1-Z2, and T1-T2 exceed corresponding thresholds which are set for each value.

Fourth Example

Next, a description will be given of the fourth example with reference to FIGS. 16 and 18. In the scanner 10 according to the fourth example, in the same manner as in the second example, the image reading unit 52 is configured by only the first reading unit 52A.

Referring to FIG. 16, when the document P is transported to the image reading unit 52, in the first reading unit 52A, the end portion of one side of the document P, that is, the edge PS1 and the end portion of the other side of the document P, that is, the edge PS2 are detected. The control unit 30 acquires a distance A1, a distance B1, and a distance C1 based on the detection information. The distance A1 is a distance from an end portion of one side of document P (the edge PS1) to the end portion of one side of the first reading unit 52A, the distance B1 is a distance from the end portion of one side of the document P (the edge PS1) to the end portion of the other side of the document P (the edge PS2), and the distance C1 is a distance from the end portion of the other side of the document P (the edge PS2) to the end portion of the other side of the first reading unit 52A.

Next, the control unit 30 transports the document P to the downstream side in the transport direction by the transport amount Y. Again, in the first reading unit 52A, the end portion of one side of the document P' (refer to the dot-dash line portion), that is, the edge PS1 and the end portion of the other side of the document P', that is, the edge PS2 are detected. The control unit 30 acquires a distance A2, a distance B2, and a distance C2 based on the detection information. The distance A2 is a distance from an end portion of one side of document P' (the edge PS1) to the end portion of one side of the first reading unit 52A, the distance B2 is a distance from the end portion of one side of the document P' (the edge PS1) to the end portion of the other side of the document P' (the edge PS2), and the distance C2 is a distance from the end portion of the other side of the document P' (the edge PS2) to the end portion of the other side of the first reading unit 52A.

Furthermore, the control unit 30 transports the document P' again to the downstream side in the transport direction by the transport amount Y. In the first reading unit 52A, the end portion of one side of the document P'' (refer to the double-dot-dash line portion) (the edge PS1) and the end portion of the other side of the document P'' (the edge PS2) are detected. The control unit 30 acquires a distance A3, a distance B3, and a distance C3 based on the detection information. The distance A3 is a distance from an end portion of one side of the document P'' (the edge PS1) to the end portion of one side of the first reading unit 52A, the distance B3 is a distance from the end portion of one side of the document P'' (the edge PS1) to the end portion of the other side of the document P'' (the edge PS2), and the distance C3 is a distance from the end portion of the other side of the document P'' (the edge PS2) to the end portion of the other side of the first reading unit 52A.

The control unit 30 determines whether or not the difference between the distance A1–the distance A2 and the distance A2–the distance A3, which are obtained based on the acquired distances A1, A2, and A3, for example, exceeds the predetermined threshold. In a case in which the threshold is not exceeded, it is determined that the document P is being ordinarily fed and the image reading job is continued.

Next, a description will be given of a feeding abnormality of the document P with reference to FIGS. 17 and 18. FIG. 17 illustrates a state in which the document P which is illustrated using a solid line is transported to the position of the document P' which is illustrated using a double-dot-dash line and FIG. 18 illustrates a state in which the document P' which is illustrated using a solid line is further transported to the position of the document P''' which is illustrated by the double-dot-dash line. Here, as illustrated in FIG. 14, for example, when multiple documents P are bound at one of the four corners by a staple and the documents P are accidentally set in the scanner 10 in this state (without removing the staple) and the feeding is to be performed, the document P to be fed rotate in a manner which draws an arc centered on the binding position of the staple. As a result, the leading end PF of the document P is displaced in an arc shape toward the downstream side in the transport direction.

As a result, when the document P is transported to the downstream side in the transport direction, the position of the edge PS1 with respect to the first reading unit 52A changes in order to the edge PS1' (refer to FIG. 17) and the edge PS1" (refer to FIG. 18). In the same manner, when the document P is transported to the downstream side in the transport direction, the position of the edge PS2 with respect to the first reading unit 52A changes in order to the edge PS2' (refer to FIG. 17) and the edge PS2" (refer to FIG. 18). Accordingly, the values of A1 to A3, B1 to B3, and C1 to C3 which are detected by the first reading unit 52A change.

As illustrated in FIGS. 17 and 18, since the document P is skewed in the counterclockwise direction, the distance A1 gradually decreases to change to the distances A2 and A3. Meanwhile, the distance C1 gradually increases to change to the distances C2 and C3. Similarly, the distance B1 also gradually increases to change to the distances B2 and B3.

When the skewing of the document P increases and the control unit 30 determines that the difference between the distance A1–the distance A2 and the distance A2–the distance A3 exceeds the threshold, the control unit 30 stops the rotation of the transport drive roller 46a, stops the transporting of the document P, and, assessing the situation as an error, ends the image reading job.

Modification Example of Fourth Example

In the present example, a configuration is adopted in which a feeding abnormality of the document P is detected according to whether or not the difference between the distance A1–the distance A2 and the distance A2–the distance A3 exceeds the predetermined threshold; however, the configuration is not limited thereto.

For example, the feeding abnormality of the document P may be detected according to whether or not the difference between the distance B1–the distance B2 and the distance B2–the distance B3 exceeds the predetermined threshold, and the feeding abnormality of the document P may be detected according to whether or not the difference between the distance C1–the distance C2 and the distance C2–the distance C3 exceeds the predetermined threshold.

Alternatively, a configuration may be adopted in which it is determined whether or not at least two of the difference between the distance A1–the distance A2 and the distance A2–the distance A3, the difference between the distance B1–the distance B2 and the distance B2–the distance B3, and the difference between the distance C1–the distance C2 and the distance C2–the distance C3 exceed the corresponding thresholds which are set for each value.

To summarize the above description, the scanner 10 is provided with the image reading unit 52 which reads the document P, the transport roller pair 46 which is provided on the upstream side of the image reading unit 52 in the document transport path 26 in which the document P is transported and transports the document P to the reading position, that is, the reading region R1 of the image reading unit 52, the second document detection sensor 48 which is provided between the transport roller pair 46 and the image reading unit 52 in the document transport path 26 and generates a detection signal based on the passage of at least the leading end PF of the document P, and the control unit 30 which receives the detection signal and the reading data of the image reading unit 52 and controls the transport roller pair 46, and the control unit 30 receives the reading data from the image reading unit 52 after receiving the detection signal, acquires the form of the document P, and selects whether or not to stop the driving of the transport roller pair 46 based on the form.

In a case in which jamming occurs, the form of the document P which is acquired by the image reading unit 52 is different from the form of the document P when the document P is ordinarily transported. Therefore, using this property, since the control unit 30 of the scanner 10 receives the reading data from the image reading unit 52 after receiving the detection signal, acquires the form of the document P, and determines whether or not to stop the driving of the transport roller pair 46 based on the form, it is possible to detect the jamming without providing a dedicated unit for detecting jamming and it is possible to suppress an increase in the cost of the apparatus. Additionally, since it is not necessary to stop the transport roller pair 46 after the transport roller pair 46 is driven for a predetermined time, which is set based on the document length, after the passing of the leading end PF of the document P is detected by the second document detection sensor 48, it is possible to suppress damage formation to the document P that accompanies jamming to a minimum level.

The control unit 30 selects whether or not to stop the driving of the transport roller pair 46 based on, of the form of the document P, the state of both edges PS1 and PS2. According to this configuration, it is possible to more accurately determine whether or not there is jamming.

The control unit 30 stops the driving of the transport roller pair 46 in a case in which the edge PS1 of one side of the document P is not parallel to the edge PS2 of the other side. According to this configuration, it is possible to easily perform the determination of whether or not there is jamming.

The control unit 30 stops the driving of the transport roller pair 46 in a case in which the form includes a missing portion of the document P in a direction which intersects the document transport direction.

In a case in which jamming occurs, the form of the document which is acquired by the image reading unit 52 may include a missing portion. Therefore, using this property, since the control unit 30 of the scanner 10 determines that there is jamming and stops the driving of the transport roller pair 46 in a case in which the form includes a missing portion of the document P in a direction which intersects the document transport direction, it is possible to easily perform the determination of whether or not there is jamming.

The scanner 10 is provided with the first reading unit 52A which is disposed on the first surface side of the document P in the document transport path 26 in which the document P is transported and reads the first surface of the document P, the second reading unit 52B which is disposed on the second surface side of the opposite side from the first surface side and reads the second surface of the document which is positioned on the downstream side of the first reading unit 52A in the document transport path 26, the transport roller pair 46 which is provided on the upstream side of the first reading unit 52A in the document transport path 26 and transports the document P to the reading position of the first reading unit 52A and the reading position of the second reading unit 52B, the second document detection sensor 48 which is provided between the transport roller pair 46 and the first reading unit 52A in the document transport path 26 and generates a detection signal based on the passage of at least the leading end PF of the document P, and the control unit 30 which receives the detection signal and reading data of the first reading unit 52A and the second reading unit 52B and controls the transport roller, in which the control unit 30 receives the reading data from the first reading unit 52A and the second reading unit 52B after receiving the detection signals to acquire the document width, compares the first document width which is acquired based on the reading data of the first reading unit 52A and the second document width which is acquired based on the reading data of the second reading unit 52B, and selects whether or not to stop the driving of the transport roller pair 46.

In a case in which jamming occurs, the document widths which are acquired by each of the first reading unit 52A and the second reading unit 52B which are disposed at deviated positions in the document transport path 26 may be different. Therefore, using this property, since the control unit 30 of the scanner 10 compares the first document width which is acquired based on the reading data of the first reading unit 52A to the second document width which is acquired based on the reading data of the second reading unit 52B to determine whether or not there is jamming and selects whether or not to stop the driving of the transport roller pair 46, it is possible to detect the jamming without providing a dedicated unit for detecting jamming and it is possible to suppress an increase in the cost of the apparatus. Additionally, since it is not necessary to stop the transport roller pair 46 after the transport roller pair 46 is driven for a predetermined time, which is set based on the document length, after the passing of the leading end PF of the document P is detected by the second document detection sensor 48, it is possible to suppress damage formation to the document P that accompanies jamming to a minimum level.

In a case in which the difference between the first document width and the second document width is greater than or equal to the predetermined value, the control unit 30 stops the driving of the transport roller pair 46. According to this configuration, it is possible to easily perform the determination of whether or not there is jamming.

The scanner 10 is provided with the image reading unit 52 which reads the document P, the transport roller pair 46 which is provided on the upstream side of the image reading unit 52 in the document transport path 26 in which the document P is transported and transports the document P to the reading position of the image reading unit 52, and the control unit 30 which receives the reading data of the image reading unit 52 and controls the transport roller pair 46, the control unit 30 acquires a distance A between an end portion of one side of the document (the edge PS1) and an end portion of one side of the image reading unit 52 which is obtained based on the reading data in the document width direction which is a direction which intersects the document transport direction in states before and after the document is first transported by the transport amount Y and after the document is further transported by the transport amount Y, and when the distance A before the document is first transported by the transport amount Y is set to A1, the distance A after the document is first transported by the transport amount Y is set to A2, and the distance A after the document is further transported by the transport amount Y is set to A3, in a case in which the difference between A1–A2 and A2–A3 exceeds a predetermined threshold, the control unit 30 stops the driving of the transport roller pair 46.

For example, when the reading of multiple documents P is to be performed, when the documents P are bound at one of the four corners by a staple and the documents P are accidentally set in the scanner 10 in this state (without removing the staple) and the feeding is to be performed, the document P to be fed rotates in a manner which draws an arc centered on the binding position of the staple, that is, the degree of skewing becomes more notable the more the feeding progresses, resulting in jamming.

It is possible to detect such a series of movements of the document through the changing of the edge positions with the transporting of the document P.

According to this configuration, since the control unit 30 acquires the distance A (that is, the edge PS1 of one side of the document P) between an end portion of one side of the document P (the edge PS1) and an end portion of one side of the image reading unit 52 which is obtained based on the reading data in states before and after the document P is first transported by the transport amount Y and after the document P is further transported by the transport amount Y, and determines whether or not to stop the driving of the transport roller pair 46 based on the change therein, it is possible to detect the jamming without providing a dedicated unit for detecting jamming and it is possible to suppress an increase in the cost of the apparatus.

Additionally, using the second document detection sensor 48 which detects the passage of the document P, since it is not necessary to stop the transport roller pair 46 after the transport roller pair 46 is driven for a predetermined time, which is set based on the document length, after the passing of the leading end PF of the document P is detected by the second document detection sensor 48, it is possible to suppress damage formation to the document P that accompanies jamming to a minimum level.

The scanner 10 is provided with the image reading unit 52 which reads the document P, the transport roller pair 46 which is provided on the upstream side of the image reading unit 52 in the document transport path 26 in which the document P is transported and transports the document P to the reading position of the image reading unit 52, and the control unit 30 which receives the reading data of the image reading unit 52 and controls the transport roller pair 46, the control unit 30 acquires a distance B between an end portion of one side of the document P (the edge PS1) and an end portion of the other side (the edge PS2) which is obtained based on the reading data in the document width direction which is a direction which intersects the document transport direction in states before and after the document P is first transported by the transport amount Y and after the document is further transported by the transport amount Y, and when the distance B before the document P is first transported by the transport amount Y is set to B1, the distance B after the document is first transported by the transport amount Y is set to B2, and the distance B after the document is further transported by the transport amount Y is set to B3, in a case in which the difference between B1–B2 and B2–B3 exceeds a predetermined threshold, the control unit 30 stops the driving of the transport roller pair 46.

According to this configuration, since the control unit 30 acquires the distance B (that is, the document width) between an end portion of one side of the document P (the edge PS1) and an end portion of the other side (the edge PS2) which is obtained based on the reading data in states before and after the document P is first transported by the transport amount Y and after the document P is further transported by the transport amount Y, and determines whether or not to stop the driving of the transport roller pair 46 based on the change therein, it is possible to detect the jamming without providing a dedicated unit for detecting jamming and it is possible to suppress an increase in the cost of the apparatus.

Additionally, using the second document detection sensor 48 which detects the passage of the document P, since it is not necessary to stop the transport roller pair 46 after the transport roller pair 46 is driven for a predetermined time, which is set based on the document length, after the passing of the leading end PF of the document P is detected by the second document detection sensor 48, it is possible to suppress damage formation to the document P that accompanies jamming to a minimum level.

The scanner 10 is provided with the first reading unit 52A which is disposed on the first surface side of the document P in the document transport path 26 in which the document P is transported and reads the first surface of the document P, the second reading unit 52B which is disposed on the second surface side of the opposite side from the first surface side and reads the second surface of the document which is positioned on the downstream side of the first reading unit 52A in the document transport path 26, the transport roller pair 46 which is provided on the upstream side of the image reading unit 52 in the document transport path 26 and transports the document P to the reading position of the first reading unit 52A and the reading position of the second reading unit 52B, and the control unit 30 which receives the reading data of the first reading unit 52A and the second reading unit 52B and controls the transport roller pair 46, in which the control unit 30 acquires the distance X1 between an end portion of one side of the document (the edge PS1) and an end portion of one side of the first reading unit 52A which is obtained based on the reading data of the first reading unit 52A in the document width direction which is a direction which intersects the document transport direction the control unit 30 acquires the distance X2 between the end portion of one side of the document (the edge PS1) and an end portion of one side of the second reading unit 52B which is obtained based on the reading data of the second reading unit 52B in the document width direction when the document is transported by the transport amount Y1 corresponding to a disposition interval between the first reading unit 52A and the second reading unit 52B, and in a case in which the difference between the distance X1 and the distance X2 exceeds a predetermined threshold, the control unit 30 stops driving of the transport roller pair 46.

When the documents are bound at one of the four corners by a staple and the documents are accidentally set in the image reading apparatus in this state (without removing the staple) and the feeding is to be performed, the document to be fed rotates in a manner which draws an arc centered on the binding position of the staple, that is, the degree of skewing becomes more notable the more the feeding progresses, resulting in jamming.

Such a series of movements of the document can be detected according to differences in the edge positions which are detected by the two reading units 52A and 52B (the first reading unit 52A and the second reading unit 52B) which are disposed leaving a predetermined interval therebetween in the document transport direction.

According to this configuration, since it is determined whether or not to stop the driving of the transport roller pair 46 based on the differences in the edge positions which are detected by the two reading units 52A and 52B (the first reading unit 52A and the second reading unit 52B), it is possible to detect the jamming without providing a dedicated unit for detecting jamming and it is possible to suppress an increase in the cost of the apparatus.

Additionally, using the second document detection sensor 48 which detects the passage of the document P, since it is not necessary to stop the transport roller pair 46 after the transport roller pair 46 is driven for a predetermined time, which is set based on the document length, after the passing of the leading end PF of the document P is detected by the second document detection sensor 48, it is possible to suppress damage formation to the document P that accompanies jamming to a minimum level.

The scanner 10 is provided with the first reading unit 52A which is disposed on the first surface side of the document P in the document transport path 26 in which the document P is transported and reads the first surface of the document P, the second reading unit 52B which is disposed on the second surface side of the opposite side from the first surface side and reads the second surface of the document which is positioned on the downstream side of the first reading unit 52A in the document transport path 26, the transport roller pair 46 which is provided on the upstream side of the image reading unit 52 in the document transport path 26 and transports the document P to the reading position of the first reading unit 52A and the reading position of the second reading unit 52B, and the control unit 30 which receives the reading data of the first reading unit 52A and the second reading unit 52B and controls the transport roller pair 46, in which the control unit 30 acquires the distance Z1 between an end portion of one side of the document (the edge PS1) and an end portion of the other side (the edge PS2) which is obtained based on the reading data of the first reading unit 52A in the document width direction which is a direction which intersects the document transport direction the control unit 30 acquires the distance Z2 between the end portion of one side of the document (the edge PS1) and an end portion of the other side (the edge PS2) which is obtained based on the reading data of the second reading unit 52B in the document width direction when the document P is transported by the transport amount Y1 corresponding to a disposition interval between the first reading unit 52A and the second reading unit 52B, and in a case in which the difference between the distance Z1 and the distance Z2 exceeds a predetermined threshold, the control unit 30 stops driving of the transport roller pair 46.

According to this configuration, since it is determined whether or not to stop the driving of the transport roller pair 46 based on the differences in the document widths which are detected by the two reading units 52A and 52B (the first reading unit 52A and the second reading unit 52B), it is possible to detect the jamming without providing a dedicated unit for detecting jamming and it is possible to suppress an increase in the cost of the apparatus.

Additionally, using the second document detection sensor 48 which detects the passage of the document P, since it is not necessary to stop the transport roller pair 46 after the transport roller pair 46 is driven for a predetermined time, which is set based on the document length, after the passing of the leading end PF of the document P is detected by the second document detection sensor 48, it is possible to suppress damage formation to the document P that accompanies jamming to a minimum level.

The invention is not limited to the examples and may be modified in various ways within the scope of the invention described in the claims, and the modifications should be construed as being included in the invention.

The entire disclosure of Japanese Patent Application No. 2017-015768, filed Jan. 31, 2017 is expressly incorporated by reference herein.

What is claimed is:

1. An image reading apparatus comprising:
a first reader which is disposed on a first surface side of a document in a document transport path in which the document is transported and reads the first surface of the document;
a second reader which is disposed on a second surface side of an opposite side from the first surface side and reads the second surface of the document, the second reader being positioned on a downstream side of the first reader in the document transport path;
a transport roller which is provided on an upstream side of the first reader in the document transport path and transports the document to a reading position of the first reader and a reading position of the second reader; and
a controller which controls the first reader, the second reader, and the transport roller,
wherein the controller detects first edges of the document based on a first reading data of the first reader and second edges of the document based on a second reading data of the second reader, the controller acquires a first width between the first edges and a second width between the second edges, and in a case in which a difference between the first width and the second width is greater than or equal to a predetermined value, the controller performs a stopping process which stops driving of the transport roller.

2. The image reading apparatus according to claim 1, further comprising:
a detection unit which is provided between the transport roller and the first reader in the document transport path, detects a leading edge of the document, and generates a detection signal in response to detection of the leading edge,
wherein the controller executes the stopping process after receiving the detection signal.

3. The image reading apparatus according to claim 1, further comprising:
a document placement portion on which the document is placed; and
a feed roller which feeds the document which is placed on the document placement portion,
wherein the transport roller is provided on the downstream of the feed roller, and
wherein the controller stops driving of the feed roller when executing the stopping process.

4. The image reading apparatus according to claim 1, wherein the controller performs the stopping process before all reading of the document is completed by the first reader and the second reader.

5. The image reading apparatus according to claim 1, wherein the predetermined value is set for a size of the document.

6. An image reading apparatus comprising:
a first reader which is disposed on a first surface side of a document in a document transport path in which the document is transported in a document transport direction and reads the first surface of the document;
a second reader which is disposed on a second surface side of an opposite side from the first surface side and reads the second surface of the document, the second reader being positioned on a downstream side of the first reader in the document transport path;
a transport roller which is provided on an upstream side of the first reader in the document transport path and transports the document to a reading position of the first reader and a reading position of the second reader; and
a controller which controls the first reader, the second reader, and the transport roller,
wherein the controller detects first edges of the document based on a first reading data of the first reader and second edges of the document based on a second reading data of the second reader, and the controller acquires, based on the first edges, a distance X1 between an end portion of one side of the document and an end portion of one side of the first reader in an intersection direction which intersects the document transport direction,
wherein the controller acquires, based on the second edges, a distance X2 between the end portion of one side of the document and an end portion of one side of the second reader in the intersection direction when the transport roller transports the document by a transport amount corresponding to a disposition interval with which the first reader and the second reader are disposed, and
wherein in a case in which a difference between the distance X1 and the distance X2 exceeds a predetermined threshold, the controller stops driving of the transport roller.

7. The image reading apparatus according to claim 6, further comprising:
a detection unit which is provided between the transport roller and the first reader in the document transport path, detects a leading edge of the document, and generates a detection signal in response to detection of the leading edge,
wherein the controller executes the stopping process after receiving the detection signal.

8. The image reading apparatus according to claim 6, further comprising:
a document placement portion on which the document is placed; and
a feed roller which feeds the document which is placed on the document placement portion,
wherein the transport roller is provided downstream of the feed roller, and
wherein the controller stops driving of the feed roller when executing the stopping process.

9. The image reading apparatus according to claim 6, wherein the controller performs the stopping process before all reading of the document is completed by the first reader and the second reader.

10. An image reading apparatus comprising:
a first reader which is disposed on a first surface side of a document in a document transport path in which the document is transported in a document transport direction and reads the first surface of the document;
a second reader which is disposed on a second surface side of an opposite side from the first surface side and reads the second surface of the document, the second reader being positioned on a downstream side of the first reader in the document transport path;
a transport roller which is provided on an upstream side of the first reader in the document transport path and transports the document to a reading position of the first reader and a reading position of the second reader; and
a controller which controls the first reader, the second reader, and the transport roller,
wherein the controller detects first edges of the document based on a first reading data of the first reader and second edges of the document based on a second reading data of the second reader, and the controller acquires, based on the first edges, a distance Z1 between an end portion of one side of the document and an end portion of the other side of the document in an intersection direction which intersects the document transport direction, wherein the controller acquires, based on the second edges, a distance Z2 between the end portion of one side of the document and the end portion of the other side of the document in the intersection direction when the transport roller transports the document by a transport amount corresponding to a disposition interval with which the first reader and the second reader are disposed, and wherein in a case in which a difference between the distance Z1 and the distance Z2 exceeds a predetermined threshold, the controller stops driving of the transport roller.

11. The image reading apparatus according to claim 10, further comprising:

a detection unit which is provided between the transport roller and the first reader in the document transport path, detects a leading edge of the document, and generates a detection signal in response to detection of the leading edge, wherein the controller executes the stopping process after receiving the detection signal.

12. The image reading apparatus according to claim 10, further comprising:

a document placement portion on which the document is placed; and a feed roller which feeds the document which is placed on the document placement portion, wherein the transport roller is provided downstream of the feed roller, and wherein the controller stops driving of the feed roller when executing the stopping process.

13. The image reading apparatus according to claim 10, wherein the controller performs the stopping process before all reading of the document is completed by the first reader and the second reader.

* * * * *